United States Patent
Tomkins et al.

(10) Patent No.: US 10,862,771 B2
(45) Date of Patent: Dec. 8, 2020

(54) ADAPTIVE SYSTEMS AND METHODS ENHANCING SERVICE QUALITY OF EXPERIENCE

(71) Applicant: Ciena Corporation, Hanover, MD (US)

(72) Inventors: Robert Kevin Tomkins, Nepean (CA); Todd Morris, Stittsville (CA); Romualdas Armolavicius, Stittsville (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/358,903

(22) Filed: Mar. 20, 2019

(65) Prior Publication Data
US 2019/0222491 A1 Jul. 18, 2019

Related U.S. Application Data

(63) Continuation-in-part of application No. 15/348,387, filed on Nov. 10, 2016, now Pat. No. 10,791,026.

(51) Int. Cl.
*H04L 12/24* (2006.01)
*H04L 12/26* (2006.01)
*H04L 29/06* (2006.01)

(52) U.S. Cl.
CPC ...... *H04L 41/5067* (2013.01); *H04L 41/0823* (2013.01); *H04L 41/142* (2013.01);
(Continued)

(58) Field of Classification Search
CPC ............. H04L 41/5067; H04L 41/142; H04L 41/0823; H04L 41/5038; H04L 43/0852;
(Continued)

(56) References Cited

U.S. PATENT DOCUMENTS 9,210,453 B1 * 12/2015 Cloonan ............ H04N 21/2385
2002/0048269 A1 4/2002 Hong et al.
(Continued)

FOREIGN PATENT DOCUMENTS

WO 2016/095943 A1 6/2016
WO 2016/119822 A1 8/2016

*Primary Examiner* — Thomas J Dailey
*Assistant Examiner* — Lam H Duong
(74) *Attorney, Agent, or Firm* — Clements Bernard Walker; Lawrence A. Baratta, Jr.; Christopher L. Bernard

(57) ABSTRACT

An optimization platform system includes a network interface configured to communicate with a plurality user devices and a plurality of servers in a network; a processor communicatively coupled to the network interface; and memory storing instructions that, when executed, cause the processor to obtain network measurements including Quality of Service (QoS) measurements and one of measured Quality of Experience (QoE) measurements and inferred QoE measurements from the QoS measurements for one or more streams in the network, wherein each of the one or more streams has a type selected from a group consisting of a video stream, a Voice over Internet Protocol (VoIP) call, a gaming stream, and an Augmented Reality (AR)/Virtual Reality (VR) stream, and wherein the QoE measurements and the inferred QoE measurements of each of the one or more streams is based on the type of the respective stream, analyze the QoE measurements to determine poor QoE in the network, determine remedial actions in the network to repair the poor QoE, and cause implementation in the network.

14 Claims, 14 Drawing Sheets

(52) U.S. Cl.
CPC ........ *H04L 41/509* (2013.01); *H04L 41/5016* (2013.01); *H04L 41/5038* (2013.01); *H04L 41/5087* (2013.01); *H04L 43/0829* (2013.01); *H04L 43/0852* (2013.01); *H04L 69/22* (2013.01); *H04L 41/0886* (2013.01)

(58) Field of Classification Search
CPC ............... H04L 41/5016; H04L 41/509; H04L 41/5087; H04L 43/0829; H04L 41/0886
USPC .......................................................... 709/224
See application file for complete search history.

(56) References Cited

U.S. PATENT DOCUMENTS

| | | |
|---|---|---|
| 2009/0083279 A1 | 3/2009 | Hasek |
| 2010/0260074 A1 | 10/2010 | Blouin et al. |
| 2011/0179186 A1 | 7/2011 | Li et al. |
| 2011/0267951 A1 | 11/2011 | Stanwood et al. |
| 2011/0280216 A1 | 11/2011 | Li et al. |
| 2013/0148525 A1 | 6/2013 | Cuadra et al. |
| 2013/0263167 A1* | 10/2013 | Parthasarathy ..... H04L 65/4084 725/14 |
| 2014/0033242 A1* | 1/2014 | Rao ...................... H04N 21/442 725/14 |
| 2014/0281739 A1* | 9/2014 | Tuffs ................... G06F 11/3452 714/47.2 |
| 2014/0286177 A1 | 9/2014 | Ni et al. |
| 2014/0341026 A1 | 11/2014 | Gahm et al. |
| 2015/0003831 A1 | 1/2015 | Moulton et al. |
| 2015/0127805 A1 | 5/2015 | Htay et al. |
| 2015/0172345 A1 | 6/2015 | Mantin et al. |
| 2016/0072669 A1 | 3/2016 | Saavedra |
| 2016/0174081 A1* | 6/2016 | Lau ....................... H04W 24/04 455/457 |
| 2016/0301593 A1 | 10/2016 | Blair et al. |
| 2017/0078171 A1* | 3/2017 | Tapia ..................... H04W 24/02 |
| 2017/0244614 A1 | 8/2017 | Wu et al. |

\* cited by examiner

ADAPTIVE SYSTEMS AND METHODS ENHANCING SERVICE QUALITY OF EXPERIENCE

CROSS-REFERENCE TO RELATED APPLICATION(S)

The present application/patent is a continuation-in-part of U.S. patent application Ser. No. 15/348,387, filed Nov. 10, 2016, and entitled "SYSTEMS AND METHODS FOR ADAPTIVE OVER-THE-TOP CONTENT QUALITY OF EXPERIENCE OPTIMIZATION," the contents of which are incorporated by reference herein.

FIELD OF THE DISCLOSURE

The present disclosure generally relates to networking systems and methods. More particularly, the present disclosure relates to systems and methods for adaptive Over-the-Top (OTT) content Quality of Experience (QOE) optimization.

BACKGROUND OF THE DISCLOSURE

OTT content includes delivery of audio, video, and/or other media over the Internet without the involvement of a Service Provider in the control or distribution of the content. The Service Provider (e.g., network operators, Multiple-System Operator (MSO), etc.) may be aware of the content of OTT-related packets, but generally is not responsible nor able to control, the viewing ability, copyright, or other redistribution of the content. OTT content is proliferating and expected to be the distribution model of the future. Conventionally, OTT content has followed a process of creating content and then publishing the content in a variety of encodings. The published content is then delivered through a plurality of networks such as the Internet, Private Networks, Content Providers (CP), Cloud Networking Providers, Content Distribution Networks (CDN), Internet Service Provider (ISP) networks, and the like. These networks have optical, packet, and higher layer components and capabilities to facilitate the delivery of the content to end clients. The popularity of content and user satisfaction is often tracked based on delivery server, social media, and other data. Programming departments may use this data to determine what content is most valued by an audience. At the same time, many of the networks involved in the delivery are often evaluated based on throughput, latency, availability, and susceptibility to attack.

For feedback, Quality of Experience (QOE) mechanisms have emerged that deliver user session specific detail by integrating functionality into the client video player which may be coupled with key information from the content provider. QOE is a measure of a customer's experiences with a service. QOE focuses on the entire service experience and is a more holistic evaluation than the more narrowly focused user experience (focused on a software interface) and customer-support experience (support focused).

QOE is just starting to be measured, but little is done with QOE except that the content provider may manually select an alternate CDN based on the QOE or adjust the configuration of the OTT Video Platform (OVP). Conventionally, OTT video QOE does not impact the optical or packet network configuration or the compute (such as Network Functions Virtualization (NFV)) infrastructure that may be the cause of the low QOE. This lack of QOE visibility and action at the optical, packet, or NFV components leads to higher cost and lower performance in OTT content delivery. When the source of the poor quality, for example, the physical network, cannot be adapted by the content provider, they will often choose to work around the problem (e.g., alternate CDN, buy dark fiber, etc.) which is ultimately more expensive. Of course, failure to act on the QOE problems in the network (optical, packet, compute, NFV, etc.) results in a lower performance solution.

Content providers and service providers with access to the QOE information may currently employ analysts to identify problems with published or cached information or with CDNs. The information is typically used to address customer complaints but may also result in manually changing the OVP configuration that controls the content publishing and CDN selection.

BRIEF SUMMARY OF THE DISCLOSURE

In an embodiment, an optimization platform system includes a network interface configured to communicate with a plurality user devices and a plurality of servers in a network; a processor communicatively coupled to the network interface; and memory storing instructions that, when executed, cause the processor to obtain network measurements including Quality of Service (QoS) measurements and one of measured Quality of Experience (QoE) measurements and inferred QoE measurements from the QoS measurements for one or more streams in the network, wherein each of the one or more streams has a type selected from a group consisting of a video stream, a Voice over Internet Protocol (VoIP) call, a gaming stream, and an Augmented Reality (AR)/Virtual Reality (VR) stream, and wherein the QoE measurements and the inferred QoE measurements of each of the one or more streams is based on the type of the respective stream, analyze the one of measured QoE measurements and inferred QoE measurements to determine poor QoE in the network, determine remedial actions in the network to repair the poor QoE, and cause implementation of the remedial actions in the network. The memory storing instructions that, when executed, can further cause the processor to obtain exogeneous data and incorporate the exogeneous data into future QoE predictions for the one or more streams, wherein the exogeneous data includes network failures, scheduled network outages, and traffic generating events.

The memory storing instructions that, when executed, can further cause the processor to extend the one of measured QoE measurements and inferred QoE measurements for the one or more services to additional services which do not have the network measurements. The additional services can share at least one link with the one or more services and the extended QoE is based on a number of shared links. The memory storing instructions that, when executed, can further cause the processor to, subsequent to the implementation, continue to monitor the one of measured QoE measurements and inferred QoE measurements relative to a target and continue to determine and cause implementation of corresponding remedial actions in the network. The memory storing instructions that, when executed, can further cause the processor to utilize the obtained network measurements to estimate future QoS and/or QoE of the one or more services utilizing any of machine learning and statistical analysis, and utilize the estimated future QoS and/or QoE to determine the remedial actions. The network measurements can include a plurality of latency, jitter, packet loss, Round Trip Time (RTT), frames per second, and congestion. The remedial actions can include any of capacity changes in the network, content cache changes in the network, routing changes for streams.

In another embodiment, a method includes, in an optimization system that includes a network interface configured to communicate with a plurality user devices and a plurality of servers in a network and a processor communicatively coupled to the network interface, obtaining network measurements including Quality of Service (QoS) measurements and one of measured Quality of Experience (QoE) measurements and inferred QoE measurements from the QoS measurements for one or more streams in the network, wherein each of the one or more streams has a type selected from a group consisting of a video stream, a Voice over Internet Protocol (VoIP) call, a gaming stream, and an Augmented Reality (AR)/Virtual Reality (VR) stream, and wherein the QoE measurements and the inferred QoE measurements of each of the one or more streams is based on the type of the respective stream; analyzing the one of measured QoE measurements and inferred QoE measurements to determine poor QoE in the network; determining remedial actions in the network to repair the poor QoE; and causing implementation of the remedial actions in the network.

In a further embodiment, a non-transitory computer-readable medium includes instructions that, when executed, cause a processor, in an optimization system that includes a network interface configured to communicate with a plurality user devices and a plurality of servers in a network and the processor communicatively coupled to the network interface, to perform the steps of obtaining network measurements including Quality of Service (QoS) measurements and one of measured Quality of Experience (QoE) measurements and inferred QoE measurements from the QoS measurements for one or more streams in the network, wherein each of the one or more streams has a type selected from a group consisting of a video stream, a Voice over Internet Protocol (VoIP) call, a gaming stream, and an Augmented Reality (AR)/Virtual Reality (VR) stream, and wherein the QoE measurements and the inferred QoE measurements of each of the one or more streams is based on the type of the respective stream; analyzing the one of measured QoE measurements and inferred QoE measurements to determine poor QoE in the network; determining remedial actions in the network to repair the poor QoE; and causing implementation of the remedial actions in the network.

In an embodiment, a method for adaptive Over-the-Top (OTT) content optimization based on Quality of Experience (QOE) is implemented in an OTT optimization platform communicatively coupled to a plurality of devices in a network. The method includes receiving a plurality of inputs including network inputs, service and software inputs, and QOE inputs; analyzing the plurality of inputs with respect to one or more OTT content streams to perform an optimization thereof; determining adjustments in the network based on the optimization; and one of notifying a network operator of the adjustments and automatically causing the adjustments in the network. The network can include a plurality of an optical layer, a packet layer, a compute layer, and a video functions layer, and wherein the adjustments can include changes to one or more of i) physical and virtual network elements in the optical layer, ii) physical and virtual network elements in the packet layer, iii) servers and other compute elements in the compute layer, and iv) physical and virtual resources in the video functions layer. The network inputs and the service and software inputs can be received from a management plane, and wherein the QOE data is received from a database which manages the QOE data from players associated with user devices.

The network can include a combination of OTT delivery elements to end users and OTT content publishing elements to provide the OTT content streams to the network, and wherein the optimization can include evaluating tradeoffs for configuring the OTT delivery elements and the OTT content publishing elements based of a plurality of factors including revenue generation, cost, resource use, function, risk, location, and impact on user QOE. The receiving can be via one or more Application Programming Interfaces (APIs) from a management plane associated with the network or directly from the network. The QOE inputs can be related to one of an individual OTT content stream to a user, a selected representative OTT content stream to a selected user amongst a group of users associated with a corresponding group of OTT content streams, and an aggregate QOE for the group of OTT content streams, and wherein the adjustments correspond to one of the individual OTT content stream and the group of OTT content streams.

The adjustments can include a determination of caching in the network based on the OTT content to improve the QOE inputs. The determining can include a determination of a particular file for OTT content is improperly encoded on a cache, and wherein the adjustments can include deletion of the file and an increase of bandwidth back to an origin server until caching of the file stabilizes. The optimization can include an evaluation of various tradeoffs to determine the adjustments, and wherein the evaluation is based on the receiving, historical inputs, forecasted use, and user defined inputs. The tradeoffs can be based on QOE versus one or more of compute resources, bandwidth, latency, and encoding of the OTT content. The QOE data can be consolidated by a system receiving feedback from a plurality of players associated with user devices consuming the OTT content.

In another embodiment, an optimization platform adapted for Over-the-Top (OTT) content optimization based on Quality of Experience (QOE) includes a network interface communicatively coupled to a network; a processor communicatively coupled to the network interface; and memory storing instructions that, when executed, cause the processor to receive a plurality of inputs including network inputs, service and software inputs, and QOE inputs, analyze the plurality of inputs with respect to one or more OTT content streams to perform an optimization thereof, determine adjustments in the network based on the optimization, and one of notify a network operator of the adjustments and automatically cause the adjustments in the network. The network can include a plurality of an optical layer, a packet layer, a compute layer, and a video functions layer, and wherein the adjustments can include changes to one or more of i) physical and virtual network elements in the optical layer, ii) physical and virtual network elements in the packet layer, iii) compute resources in the compute, and iv) physical video relevant appliances or video virtual functions in the video functions layer.

The network inputs and the service and software inputs can be received from a management plane, and wherein the QOE data is received from a database which manages the QOE data from players associated with user devices. The network can include a combination of OTT delivery elements to end users and OTT content publishing elements to provide the OTT content streams to the network, and wherein the optimization can include evaluating tradeoffs for configuring the OTT delivery elements and the OTT content publishing elements based on a plurality of factors including revenue generation, cost, resource use, function, risk, location, and impact on user QOE. The receiving can be via one or more Application Programming Interfaces (APIs) from a management plane associated with the network. The QOE inputs can be related to one of an individual OTT content stream to a user, a selected representative OTT content stream to a selected user amongst a group of users associated with a corresponding group of OTT content streams, and an aggregate QOE for the group of OTT content streams, and wherein the adjustments correspond to one of the individual OTT content stream and the group of OTT content streams. The optimization can include an evaluation of various tradeoffs to determine the adjustments, and wherein the evaluation is based on the receiving, historical inputs, forecasted use, and user defined inputs. The QOE data can be consolidated by a system receiving feedback from a plurality of players associated with user devices consuming the OTT content.

In a further embodiment, a non-transitory computer readable medium includes instructions executable by a processor, and in response to such execution causes the processor to perform operations including receiving a plurality of inputs including network inputs, service and software inputs, and QOE inputs; analyzing the plurality of inputs with respect to one or more OTT content streams to perform an optimization thereof; determining adjustments in the network based on the optimization; and one of notifying a network operator of the adjustments and automatically causing the adjustments in the network.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various embodiments, the present disclosure relates to systems and methods for adaptive Over-the-Top (OTT) Quality of Experience (QOE) optimization. The systems and methods cover the automated allocation and continually re-adjusted allocation of the resources (e.g., optical, packet, NFV, etc.) used for over the top (OTT) content publishing and delivery based on the user Quality of Experience and the network economics. This is a form of analytics. The systems and methods include an OTT optimization platform and OTT optimization process that closes a feedback loop between the QOE data and the underlying network. Various adjustments are contemplated herein to optimize OTT content delivery based on real-world QOE feedback.

Further, the present disclosure relates to adaptive systems and methods enhancing service QOE. The adaptive systems and methods enhance and ensure QOE in a network where service application measurements and network Quality of Service (QOS) measurements are collected. The adaptive systems and methods use statistical or machine learning techniques to predict QOE and QOE target violations and use these predictions to adaptively create, schedule, and implement a plan to mitigate inadequate QOE by changing network capacity or configuration. The adaptive systems and methods apply in particular to adaptive bitrate video streaming services and more generally to services such gaming, Voice over Internet Protocol (VoIP), Augmented Reality (AR) and Virtual Reality (VR) and other services where Quality of Experience depends critically on QOS factors such as latency and end-to-end packet loss. The adaptive systems and methods provide an integrated solution that provides for QOS and QOE collection, prediction, and analysis to ensure that a mitigation plan is maintained to ensure that target QOE is maintained in an ongoing fashion.

OTT Content Creation to Delivery in a Network

Figure 1:
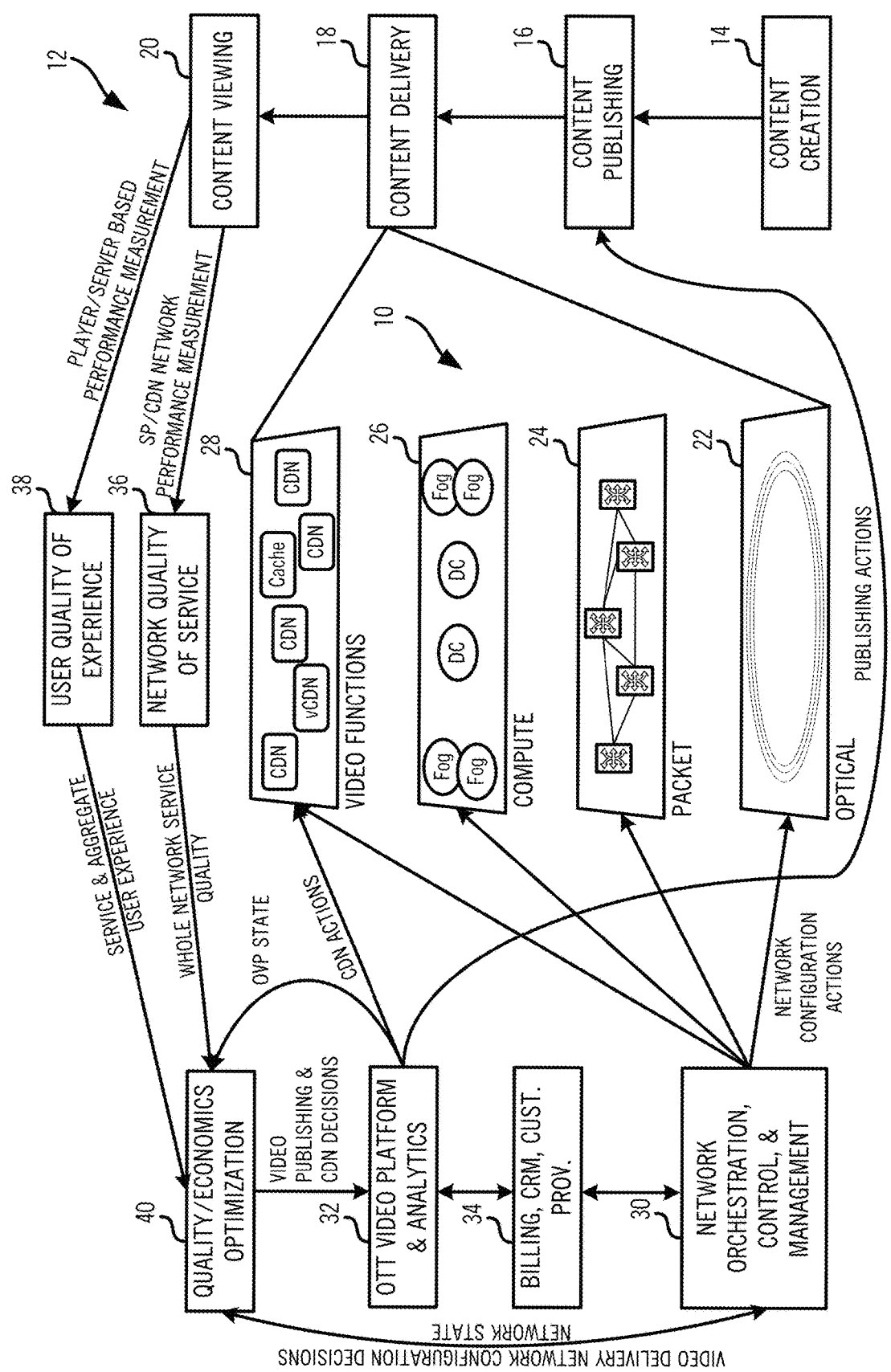
FIG. 1 is a network diagram and flow diagram of a network and OTT content process describing OTT content from creation to delivery.

FIG. 1 is a network diagram and flow diagram of a network 10 and OTT content process 12 describing OTT content from creation to delivery. The OTT content process 12 includes four major steps for OTT content to end in the hands of the end user. Specifically, the OTT content process 12 includes content creation 14, content publishing 16, content delivery 18, and content viewing 20. The content creation 14 is where the OTT content, e.g., video, audio, etc., is recorded, generated, etc. The content publishing 16 is the process of preparing the OTT content for consumption and includes such aspects as encoding, static advertisement insertion, pricing, Digital Rights Management (DRM), user and device management, and the like. The content delivery 18 is the process of transmitting the OTT content from its origin or hosting location to the destination device. This can be performed live or on demand and can be streamed, where delivery is in parallel with viewing, or downloaded, where the OTT content is completely delivered prior to viewing. The content viewing 20 is the process of displaying or consuming the OTT content on a physical device.

The content delivery 18 is over the network 10 which includes one or more networks which can have different layers, such as an optical layer 22, a packet layer 24, a compute layer 26, and a video functions layer 28. The optical layer 22 can include optical network elements operating at Layer 0 (photonic—Dense Wave Division Multiplexing (DWDM)) and/or Layer 1 (Time Division Multiplexing (TDM) such as Optical Transport Network (OTN)). The packet layer 24 can include packet network elements such as switches, routers, etc. operating at Layer 2 and/or 3, such as Ethernet, Multiprotocol Label Switching (MPLS), Internet Protocol (IP), and the like. The compute layer 26 can include dedicated compute capable hardware and/or Virtual Network Functions (VNF) via compute elements which executed the VNFs in data centers, via fog computing, etc. The video functions layer 28 can perform content oriented software functions, such as Content Distribution Networks (CDN), virtual CDNs (vCDN), caching, etc.

The network elements and compute elements in the layers 22, 24, 26, 28 can be managed by a management plane 30 and an OTT Video Platform (OVP) and OTT analytics (OVA) platform 32. The management plane 30 can be one or more of a network orchestrator, Software Defined Networking (SDN) Controller, a Control Plane, or the like. If the management plane 30 include a network orchestrator, a Network Management System (NMS), and/or OVP, these devices can interface to a Billing, Customer Records Management (CRM), and Customer Provisioning system 34.

As the OTT delivery 18 crosses multiple networks, via the layers 22, 24, 26, 28, network quality of service (QOS) measurement services 36 have been deployed, primarily in the cloud, to evaluate how the network 10, especially cloud services, commercial Content Delivery Network (CDN), and Internet Service Provider (ISP) networks, are performing.

However, these network measurements are purely in aggregate and do not enable the provider or any of the delivery network 10 to understand the user quality of experience. For example, if a user called to complain about a particular OTT video's delivery, until recently, there was no mechanism for the content provider or any of the delivery networks to understand what experience that exact OTT video session had experienced. Recently, some video players have had the quality of experience measurement transmission integrated into a cloud computing system to create a database of the user video session experiences and to analytically analyze that user QOE data 38.

In various embodiments, a quality/economics optimization platform 40 completes the feedback cycle by taking the aggregate and individual QOE data 38 measurements and analyzes them to understand how to obtain a target level of OTT video publishing and/or delivery quality and revenue with the lowest cost. The platform 40 continuously adapts to OTT video publishing and/or network state to adjust the cost versus quality/revenue equation.

The platform 40 can interface to various components in the network 10 via Application Programming Interfaces (APIs). Specifically, the platform 40 can receive service and aggregate user QOE information from the QOE data 38 and the platform 40 can receive network service quality from the QOS measurements 36. The platform 40 can provide video publishing and CDN decisions to the platform 32. Further, the platform 40 can interface to the management plane 30 for video delivery network configuration decisions and to receive network state updates. These APIs allow the platform 40 to identify the resources allocated to OTT content delivery, the resources which could be allocated to OTT content delivery, the state of the OTT content delivery networking and publishing solution, and the quality of service and user quality of experience that is measured with the current network state in the network 10. Further, where the network orchestration, control, and management plane 30 lacks key adaptive capabilities, it may be necessary for the platform 40 to interface directly with any device or function in the network 10.

The platform 40 operates on the principle that the optimal state for the OTT content is one where QOE, revenue, and cost (e.g., capital expense (CAPEX), operating expense (OPEX), and/or administrative values) are optimized in accordance with policy. The platform 40 leverages policy and preconfigured cost and revenue information to process the target User QOE, compare against policy, evaluate alternative resource and software configurations in the network 10, and adjust the state of the OTT video delivery network 10 and the OTT video publishing functions of the OVP to achieve the target QOE with the minimal cost/maximum revenue.

In essence, the platform 40 is a series of APIs and an analytics engine operating on a processing apparatus. The analytics engine is driven by a variety of processes to trade off some or all components of OTT content delivery elements and OTT content publishing elements based on an evaluation of their revenue generation, cost, resource use, function, risk, location, impact on user QOE, and other attributes.

By analyzing the User QOE and/or the network QOS data in the context of the network 10 and OVP state, the analytics engine in the platform 40 can decide whether to increase, reduce, or maintain the resources used for OTT content delivery in the network 10. An increased investment would be targeted at increasing resources in the manner that is most effective to increase QOE and/or Revenue with the lowest cost. Similarly, reducing the resources would evaluate the network 10 in the context of minimizing the QOE and revenue impact but delivering the greatest savings. Typically, components of the solution that are overwhelmed or dysfunctional would be obvious areas for the platform 40 to invest in to improve the QOE with minimal cost impact. Underutilized areas of the network 10 or OVP solution would be obvious areas to reduce the overall solution cost.

Thus, by introducing the platform 40 with the analytics engine with QOE and economic policy based decision making centered around user QOE, network QOS, OVP state, and network state can deliver a more cost optimized OTT content publishing and delivery solution. When network configuration actions can be communicated to the network 10 or OVP elements quickly through a near real-time management solution, SDN, NFV, and/or orchestration, the platform 40 will enable near real-time adjustments to fix publishing and delivery solutions and continuously adjust the user QOE to be in line what the QOE and economics policy. This ensures a stronger QOE, high performance, and cost efficiency.

Quality of Experience (QOE)

Again, QOE is a measure of a customer's experiences with a service, i.e., the OTT content. QOE focuses on the entire service experience and is a more holistic evaluation than the more narrowly focused user experience (focused on a software interface) and customer-support experience (support focused). Recently, new QOE solutions have emerged that deliver user session specific detail by integrating functionality into the client video player (client) which may be coupled with key information from the content provider. This QOE detail may be provided through events, measurements, and the environment detected through the client or content provider. The QOE detail is often analyzed and provided to the content provider and/or delivery network providers. Forums like the Streaming Video Alliance (SVA) and the Consumer Technology Association (CTA) are forming best practices and standardizing on these metrics, events and environmental variables provided by QOE solutions. Examples of such metrics and events include the following:

| delivered bitrate | labeled bitrate | player resolution |
|---|---|---|
| buffer length (current & max) | re-buffering ratio | interruptions ratio |

-continued

| | | |
|---|---|---|
| player errors | network type | network signal strength |
| player state | exit before video count | exit before video start ratio |
| video start time | video start failure | master manifest URL |
| variant manifest URL | play failure count | play failure ratio |
| In-stream failure count | play head time | bytes downloaded |
| throughput | sleep | Shutdown |
| geolocation | streaming server IP Address | client IP address |
| Closed caption/Subtitle quality | CPU utilization | GPU utilization |
| memory utilization | VPN presence | CDN node type |
| CDN edge server IP address | Server Redirection | VPN presence |
| OS version | Browser info | |

EXAMPLE NETWORK

Figure 2:
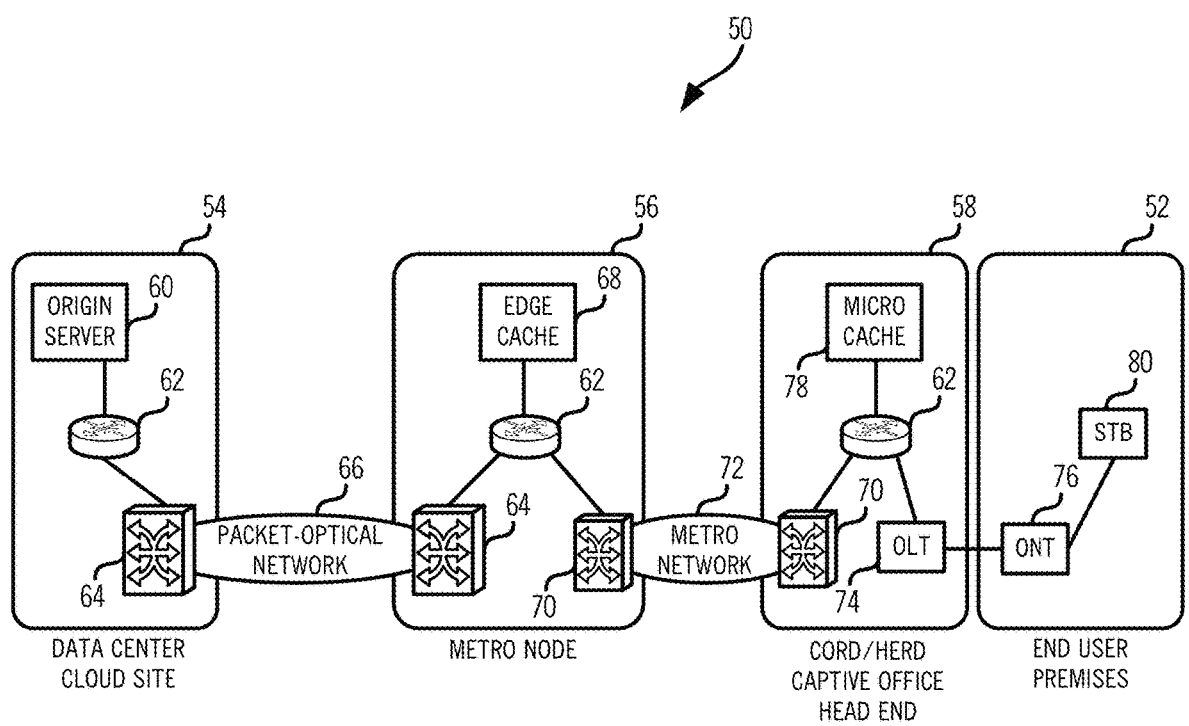
FIG. 2 is a network diagram of a network illustrating content distribution to an end user.

FIG. 2 is a network diagram of a network 50 illustrating content distribution to an end user 52. The network 50 provides additional details of the components in the network 10. Specifically, the network 50 illustrates one configuration to deliver an OTT content stream to the end user 52. Components in the network 50 can include a data center/cloud site 54, a metro node 56, a captive office/head end 58, and the end user 52. The data flow for the OTT content is from the site 54 through the metro node 56 and the head end 58 to the end user 52. The site 54 can include an origin server 60 hosting the OTT content, one or more routers/switches 62, and a network element 64. The origin server 60 provides the OTT content through the one or more routers/switches 62 to the network element 64. The one or more routers/switches 62 can provide higher layer connectivity (L2 and above) and the network element 64 can provide L0, L1, L2, and/or L3 connectivity to a packet-optical network 66.

The packet-optical network 66 provides long haul, regional connectivity between the site 54 and the metro node 56. The metro node 56 provides metro connectivity and includes the network element 64 interfacing to the packet-optical network 66. The metro node 56 can include an edge cache 68 for locally caching OTT content from the origin server 60. Specifically, the edge cache 68 can deliver the OTT content to avoid connectivity or the latency of the packet-optical network 66. This edge cache 68 and even the micro cache 78 may be a set of devices and functions including reverse proxy, firewall, content caching, load balancing, dynamic ad insertion, personalization, packet switching, routing, etc. The metro node 56 includes a network element 70 interfacing a metro network 72. The metro network 72 is similar to the packet-optical network 66 albeit optimized to the metro scale. The metro node 56 includes the one or more routers/switches 62 interconnecting the edge cache 68 and the network elements 64, 70.

The head end 58 includes the network element 70 interfacing the metro network 72. In an embodiment, the head end 58 includes an Optical Line Terminal (OLT) 74 which can be part of a Passive Optical Network (PON) interfacing an Optical Network Terminal (ONT) 76 at or near the end user 52. The head end 58 can further include a micro cache 78 which can locally cache the OTT content at the head end 58. The one or more routers/switches 62 at the head end 58 can connect the network element 70 to the OLT 74. The caches 68, 78 are used to reduce upstream network bandwidth and reduce latency for OTT content by storing some content, such as based on demand, locally to reduce requests back to the origin server 60. At the end user 52, a Set Top Box 80 or equivalent is communicatively coupled to the ONT 76 for receiving the OTT content.

Those of ordinary skill in the art will recognize the network 50 is presented for illustration purposes, and the network 50 can include other network technologies, configurations, etc. For example, the end user 52 in the network 50 is shown using PON and the STB 80, but other access technologies are also contemplated, such as cable modems, wireless, etc. Also, the STB 80 could be replaced with a user device which accesses the OTT content, such as over a local wireless network. Of course, various embodiments are contemplated for the networks 10, 50.

Optimization Method and Platform

Figure 3:
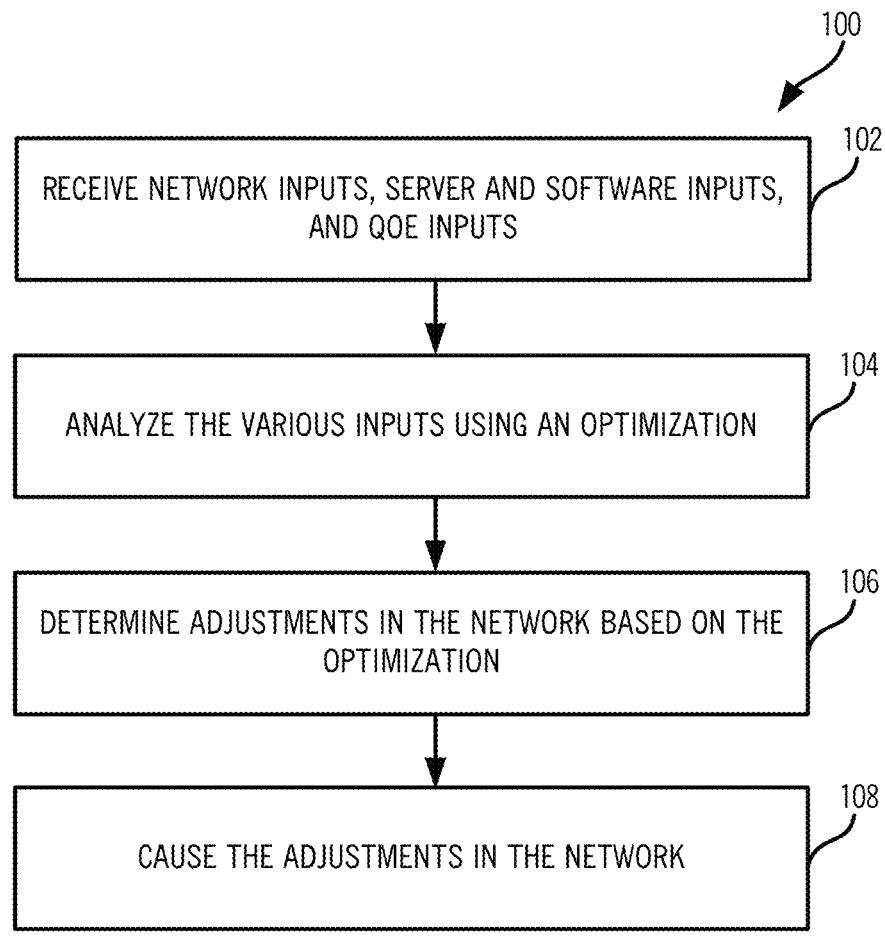
FIG. 3 is a flowchart of an OTT content optimization method implementable via the optimization platform.

FIG. 3 is a flowchart of an OTT content optimization method 100 implementable via the optimization platform 40. Again, the optimization platform 40 has connectivity to the network 10, 50, such as via various APIs, and an analytics engine to perform optimization, to tweak/adjust the network 10, 50 based on various inputs including QOE data. The optimization method 100 includes receiving network inputs, server and software inputs, and QOE inputs (step 102). The network inputs are from any of the optical layer 22, the packet layer 24, and/or the compute layer 26. That is, the network inputs are from any physical or virtual network elements, from the management plane 30, or the like. Example network inputs include the following for both physical and virtual network elements:

Topology
link state
port and logical port utilization
link and nodal latency
Jitter
by port and logical port transmitted, received, errored and discarded frames and bytes
memory utilization
Central Processing Unit (CPU) utilization
network or resource congestion
power utilization
system and card temperatures
device attributes for physical and virtual nodes The server and software inputs can be from the video functions layer 28 and/or the NFVI layer 26. Example server and software inputs include the following:

Virtual Machine (VM)/container state
disk capacity, quota, and utilization
CPU/Graphics Processing Unit (GPU) utilization and quota
system temperature
disk integrity
disk type
Operating System (OS)
power utilization
application state and attributes The QOE inputs can be from the QOE data 38. Example QOE inputs include the following:

| | |
|---|---|
| delivered bitrate | labeled bitrate |
| buffer length (current & max) | re-buffering ratio |
| interruptions ratio | player errors |
| client network type | client network signal strength |
| player state | exit before video count |
| exit before video start ratio | video start time |
| video start failure | master manifest Uniform Resource Locator (URL) |
| variant manifest URL | play failure count |

| | |
|---|---|
| play failure ratio | In-stream failure count |
| play head time | bytes downloaded |
| throughput | client active/idle/sleep/shutdown state |
| client geolocation | streaming server Internet Protocol (IP) Address |
| client IP address | Closed caption/Subtitle quality |
| Client CPU utilization | Client GPU utilization |
| memory utilization | Virtual Private Network (VPN) presence |
| CDN node type | CDN edge server IP address |
| Server Redirection | Operating System (OS) |
| OS version | Browser info |

With the inputs, the OTT content optimization method 100 analyzes the various inputs using an optimization (step 104), determines adjustments in the network 10, 50 based on the optimization (step 106), and causes the adjustments in the network 10, 50 (step 108). The OTT content optimization method 100 can be implemented continuously, on demand, or periodically. The intent of the optimization is to review and analyze all of the inputs including the QOE inputs and determine adjustments in the network 10, 50 accordingly. The adjustments can be based on reducing cost, improving quality (QOE), and the like based on various tradeoffs.

The OTT content optimization method 100 can continuously and/or periodically receive the inputs and maintain historical values of the inputs. Also, the OTT content optimization method 100 can have forecasted use of OTT content. Further, the OTT content optimization method 100 can have user defined inputs such as costs, location, etc. Based on the current inputs, the historical inputs, the forecasted use, and the user defined inputs, the OTT content optimization method 100 performs a qualitative evaluation of various tradeoffs to determine network adjustments.

In an embodiment, the optimization is performed for the following qualitative evaluations:
QOE/Bandwidth trade-offs by qualitative evaluation, forecasted use, cost, and/or location
QOE/Revenue trade-offs by qualitative evaluation, forecasted use, cost, and/or location
QOE/CPU/GPU trade-offs by qualitative evaluation, forecasted use, cost, and/or location
QOE/Memory trade-offs by qualitative evaluation, forecasted use, cost, and/or location
QOE/Cost trade-offs by qualitative evaluation, forecasted use, cost, and/or location
QOE/Latency trade-offs by qualitative evaluation, forecasted use, cost, and/or location
Device reliability/Revenue trade-offs by forecasted evaluation, use, cost, and/or location
Bandwidth/Storage trade-offs by forecasted use, cost, and/or location
CPU/GPU/Storage trade-offs by forecasted use, cost, and/or location
CPU/GPU/Bandwidth trade-offs by forecasted use, cost, and/or location
Re-encoding of corrupted encoded files by cost, forecasted popularity, and/or location The adjustments in the network 10, 50 can be adjusting existing services in the network 10, 50 as well as provisioning new services. The OTT content optimization method 100 contemplates the adjustment in one or more of the layers 22, 24, 26, 28. The following lists example actions which the platform 40 can implement to cause adjustments in the network 10, 50 based on the optimization:

Logical or physical, packet or optical, Link/Port bandwidth adjustment
provisioning of new packet and/or optical network connections
optical or packet traffic rerouting
virtual machine/container memory quota adjustment
virtual machine/container memory quota
new virtual machine/container deployment
server redirection/substitution
content caching/placement request
content re-encoding
content access modification
operator alerts
altered personalization and advertisement attributes
payment adjustments
end user notification
CDN notification
CDN switching
device isolation The optimization platform 40 and the OTT content optimization method 100 can adjust any of the components in the network 10, 50 from the content publishing 16, the content delivery 18, and the content viewing 20. That is, from the origin server 60 to the end user 52, including all of the data center, core, metro, edge, and end user premises equipment in between.

Figure 4:
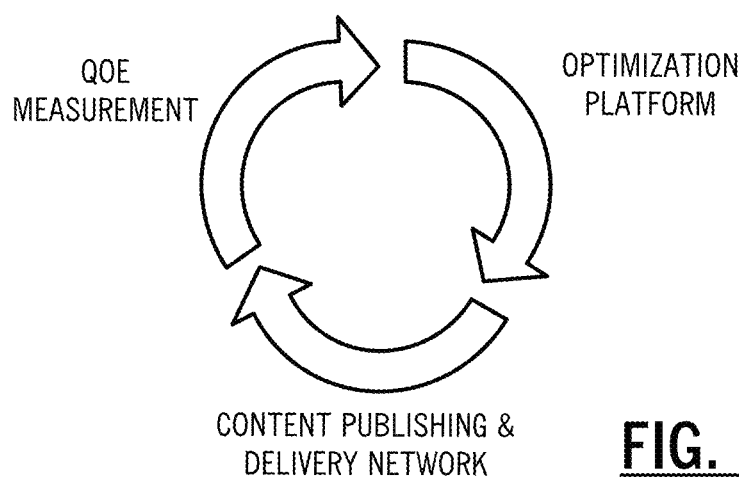
FIG. 4 is a diagram of a feedback loop formed between the QOE data, the optimization platform, and the network components for OTT content publishing and delivery.

FIG. 4 is diagram of a feedback loop formed between the QOE data 38, the optimization platform 40, and the network 10, 50 components for OTT content publishing and delivery. Again, while OTT video has been in existence for a while, the ability to measure the end user QOE by video stream is new. To date, there has been nothing to complete the feedback loop to the network 10, 50. Again, the optimization platform 40 analyses the current user QOE against a set of policies that define the desired quality of experience. Note, the optimization platform 40 and the OTT content optimization method 100 can be implemented on individual user streams and their QOE, groups of user streams and either their aggregate QOE or a representative stream's QOE, or the like.

Once the analysis is complete, if the user QOE (an individual stream QOE, a representative stream QOE, or an aggregate QOE for a group of streams) is less than a target, the optimization platform 40 and the OTT content optimization method 100 will evaluate potential network causes for the discrepancy and pursue alternative network configurations, based on policies defined by the network operator. If better QOE would result from an alternate network configuration and/or if an action is necessary because of the analysis (e.g., SLA penalty), the optimization platform 40 and the OTT content optimization method 100 recommend and/or causes this change or action from the network operator.

This feedback loop can be fully automated by using APIs to suggest network changes to the network orchestration, control, and management components of the network 10, 50 instead of relying on network operator administration to make changes. This would convert the recommendations above to automated and adaptive network actions.

The feedback loop can further be extended to include OVP functions by including the OVP components and their software, storage, and hardware resource components in the analysis of the QoE and the potential causes of poor quality of experience. The optimization platform 40 and the OTT content optimization method 100 could then recommend configuration changes and/or actions from the operator, the OVP, and/or the network orchestrator, control, and management components. One of many potential scenarios is to identify a popular improperly encoded file on a cache, have that file deleted and bandwidth to the origin server 60 temporarily increased until encapsulation is regenerated and the caching of the popular content stabilizes.

Further, the optimization platform 40 and the OTT content optimization method 100 can evaluate cost information in the analysis. This is performed by adding a set of policies that allow the operator to define cost and revenue. The cost and revenue policies are leveraged to optimize the current and potential network and/or the OVP states that could potentially lead to the target QOE with an aim to maximize the revenue, minimize the cost and achieve the target QOE.

In an embodiment, a process for adaptive Over-the-Top (OTT) content optimization based on Quality of Experience (QOE) is implemented in an OTT optimization platform communicatively coupled to a plurality of devices in a network. The process includes receiving a plurality of inputs including network inputs, service and software inputs, and QOE inputs; analyzing the plurality of inputs with respect to one or more OTT content streams to perform an optimization thereof; determining adjustments in the network based on the optimization; and one of notifying a network operator of the adjustments and automatically causing the adjustments in the network.

The network can include a plurality of an optical layer, a packet layer, a compute layer, and a video functions layer, and wherein the adjustments can include changes to one or more of i) network elements in the optical layer, ii) network elements in the packet layer, iii) virtual network elements in the NFVI, and iv) compute resources in the video functions layer. The network inputs and the service and software inputs can be received from a management plane, and wherein the QOE data can be received from a database which manages the QOE data from players associated with user devices. The network can include a combination of OTT delivery elements to end users and OTT content publishing elements to provide the OTT content streams to the network, and wherein the optimization can include evaluating tradeoffs for configuring the OTT delivery elements and the OTT content publishing elements based off a plurality of factors including revenue generation, cost, resource use, function, risk, location, and impact on user QOE.

The receiving can be via one or more Application Programming Interfaces (APIs) from a management plane associated with the network or directly from the network itself. The QOE inputs can be related to one of an individual OTT content stream to a user, a selected representative OTT content stream to a selected user amongst a group of users associated with a corresponding group of OTT content streams, and an aggregate QOE for the group of OTT content streams, and wherein the adjustments can correspond to one of the individual OTT content stream and the group of OTT content streams. The adjustments can include a determination of caching in the network based on the OTT content to improve the QOE inputs.

The determining can include a determination of a particular file for OTT content is improperly encoded on a cache, and wherein the adjustments can include deletion of the file and an increase of bandwidth back to an origin server until caching of the file stabilizes. The method of claim 1, wherein the optimization can include an evaluation of various tradeoffs to determine the adjustments, and wherein the evaluation can be based on the receiving, historical inputs, forecasted use, and user defined inputs. The tradeoffs can be based on QOE versus one or more of compute resources, bandwidth, latency, and encoding of the OTT content. The QOE data can be consolidated by a system receiving feedback from a plurality of players associated with user devices consuming the OTT content.

Optimization Examples

Again, the optimization is performed on a single OTT content stream or a group of OTT content streams. The following illustrate some non-limiting examples of the optimization performed by the optimization platform 40 and/or the OTT content optimization method 100. For example, where the QOE data identifies n+ (where n is defined in policy) users impacting QOE issues, and all of the n+ users are sourced from caches located in the same location running at higher than normal CPU levels, the optimization platform 40 can spin up new instances of caches in that location along with the appropriate changes or instantiations of load balancers, firewalls, and routing/switching NFV functions to spread the high load amongst a greater number of caches.

Also, where QOE measurements identify n+ (where n is defined in policy) flows with user impacting issues, the optimization platform 40 can use the detailed flow information to map out the path that flow would traverse over the network topology and examine each of the network and compute components along the path. It could then identify network anomalies. For example, it might recognize unusually high latency for flows over a path and reoptimize the network to put the video flows on a lower latency path. For example, the optimization platform 40 might recognize unusual intermittent packet drop for flows over a network link and could perform various actions.

First, the various actions could include, where different networks (e.g., video, Internet, business) are overlaid on the same infrastructure with individual bandwidth quotas, the optimization platform 40 could adjust the video network to have a higher bandwidth quota. Second, where there is an open consumption model, the optimization would look at increasing the bandwidth quota, if possible. If not possible, it could examine the network resources available to add bandwidth to the network by creating new wavelengths, Link Aggregation Group (LAG) groups, Multiprotocol Protocol Label Switching (MPLS) Label Switched Paths (LSPs), etc. and their associated buffer, queuing, and like characteristics along the constrained path.

Third, where IP QOS is active or configurable, the optimization could adjust the discard eligibility and emission priorities for the video to be more favorable. Fourth, where MPLS is available, the optimization could use MPLS to traffic engineer the flow around the congestion point. The optimization platform 40 could also reroute users to a different cache, away from the congestion. The optimization platform 40 could analyze all of the aforementioned options and any other options that apply to select the least cost effective solution.

The optimization platform 40 could periodically assess trends in QOE. If the optimization platform 40 recognizes a decreasing user QOE, the optimization platform 40 could identify the portions of the network and compute infrastructure that are most commonly associated with the users experiencing a QOE decline and revector resources to increase the QoE (as discussed above) to proactively prevent the QoE from crossing a policy defined threshold for minimum Quality of Experience. On the other hand, the optimization platform 40 could similarly reduce the resources associated with video QOE where QOE is well beyond the QOE policy to reduce the overall service cost.

The optimization platform 40 could identify that optimization platform 40 issues for n+ users and map to the videos at the point of ad insertions and provision the OVP to turn off ad insertion or to use a statically defined ad while operators investigate the dynamic ads for corruption or connection issues.

The optimization platform 40 could periodically assess the cost tradeoff of bandwidth vs. storage while maintaining a QOE above a policy directed threshold. Making a large quantity of storage available for caching in the network allows for more content to be cached and thus less bandwidth would be required from upstream content sources. Similarly, making a large quantity of bandwidth available reduces the need for caching all but the most frequently requested content and thus less storage is required. The optimization platform 40 could look at its policy for the cost of storage versus the cost of bandwidth and couple with that the cache hit rates of the content being cached. The optimization platform 40 may determine that it could save costs by freeing up storage and/or adding caching and reverse proxy instances and boosting the bandwidth resources to the end user or redirecting them to another caching site due to content having a low cache hit rate. Similarly, if the optimization platform 40 found a high cache hit rate, it may determine that adding additional storage to existing cache and/or increasing the cache instances and reducing the available bandwidth would be more effective and less costly.

Example Server

Figure 5:
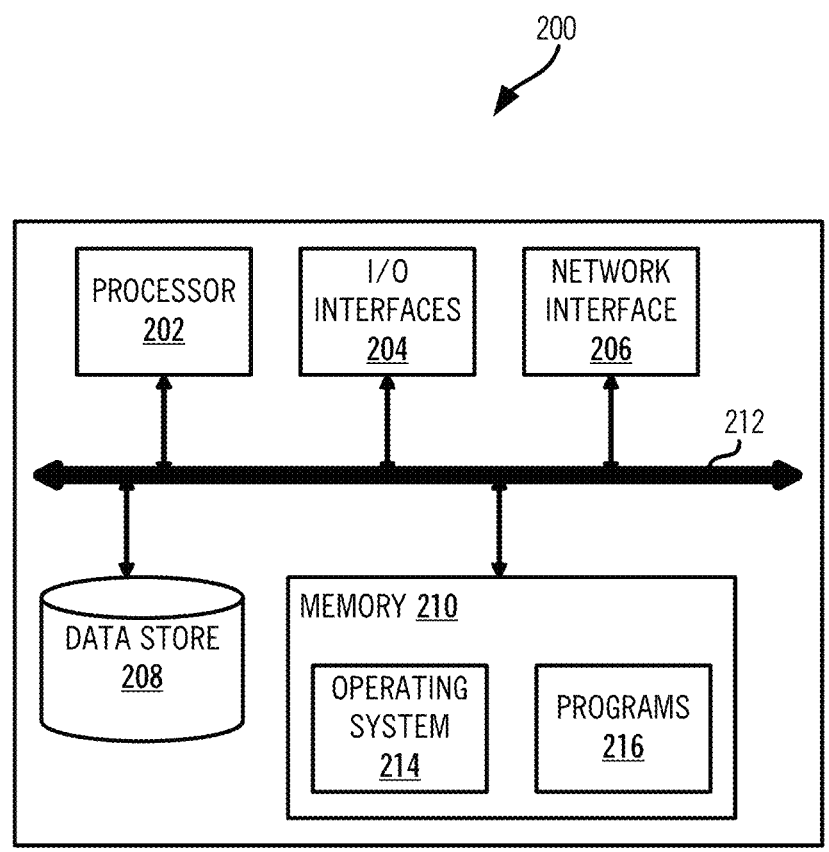
FIG. 5 is a block diagram of an implementation of a server, which can be used to implement the optimization platform and/or the OTT content optimization method.

FIG. 5 is a block diagram of an example implementation of a server 200, which can be used to implement the optimization platform 40 and/or the OTT content optimization method 100. The server 200 can be a digital processing device that, in terms of hardware architecture and functionality, generally includes a processor 202, input/output (I/O) interfaces 204, a network interface 206, a data store 208, and memory 210. It should be appreciated by those of ordinary skill in the art that FIG. 5 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 can be, for example, but not limited to, one or more buses or other wired or wireless connections, as is known in the art. The local interface 212 can have additional elements, which are omitted for simplicity, such as controllers, buffers (caches), drivers, repeaters, and receivers, among many others, to enable communications. Further, the local interface 212 can include address, control, and/or data connections to enable appropriate communications among the aforementioned components.

The processor 202 is a hardware device for executing software instructions. The processor 202 can be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 can be used to receive user input from and/or for providing system output to one or more devices or components. The network interface 206 can be used to enable the server 200 to communicate on a network.

The data store 208 can be used to store data. The data store 208 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 can incorporate electronic, magnetic, optical, and/or other types of storage media. The memory 210 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 can incorporate electronic, magnetic, optical, and/or other types of storage media. Note that the memory 210 can have a distributed architecture, where various components are situated remotely from one another, but can be accessed by the processor 202. The software in memory 210 can include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Adaptive Systems and Methods

In various embodiments, the adaptive systems and methods include forecasting QOE, forecasting QOS, joint forecasting of QOE and QOS, forecasting with exogenous data, extrapolation with instrumented service diagnostics, an adaptive mode with predicted QOS, QOE, and exogenous data, and application to non-video environments. The adaptive systems and methods include ensure QOE in a network by collecting application measurements and network measurements, correlating the application measurements and network measurements to identify the network sources of inadequate QOE, determining which sources of inadequate QOE to repair based on cost/benefit analysis, and modifying the network to repair QOE. The network measurements can be QOS including port/link packet loss, Transmission Control Protocol (TCP) round trip time, etc. The application measurements can be QOE including stream routing, buffer underflows, encoding rate switches, etc. The network applications can include video streaming, VoIP, gaming, etc.

In another embodiment, the adaptive systems and methods include forecasting QOS and QOE separately or jointly in a network via collection of application measurements and network measurements. This can incorporate trends and seasonality, the impact of exogeneous data (data that originated external from the network), correlate QOS and QOE when both are measured, identify violations of target QOE. The exogenous data can include network failures, scheduled equipment outages, traffic generating events (sporting events, popular shows), etc. The application measurements can include stream routing, buffer underflows, stream encoding rate switches, etc.

The adaptive systems and methods can extrapolate diagnostic abilities from one service that collects application measurements to another service which does not. The adaptive systems and methods are adaptive in that they ensure QoE levels via continuous monitoring and adapting to maintain QoE targets. Further, the adaptive systems and methods can be utilized in various service types including non-video services where there may be a broader range of QoS and QoE metrics or service-specific metrics. Examples of other types of services include, without limitation, gaming, Voice over Internet Protocol (VoIP), Augmented Reality (AR), Virtual Reality (VR), and the like.

In an embodiment, the adaptive systems and methods evaluate QoE with a dual (or, more generally, multiple) metric focus. For example, content sources that are more latency sensitive than video and natively focus on two QoE metrics, dual metricizing packet loss and a latency and unifying the flow QoE latency metrics and the flow QoE packet loss metrics into port, path, and source/destination QoE latency metrics and QoE packet loss metrics. In another embodiment, the adaptive systems and methods measure performance/QoE impact of telemetry communications from an end user to an AR/VR cache/server for evaluating network performance implications on the application. The adaptive systems and methods can evaluate QoE with a split focus on a packet loss and latency and unifying the flow QoE latency metrics and the flow QoE packet loss metrics into port, path, and source/destination QoE latency metrics and QoE packet loss metrics content performance and QoE.

The term QoS will refer to Quality of Service: typical examples are packet loss probability and latency on router egress ports traversed by a packet stream. The term QoE will refer to Quality of Experience: typical examples for streaming video are bitrate switching event counts, buffer underflows, and buffering ratios (ratio of "blank screen" to "image present time"). QoE metrics will generally depend on the service being delivered (for example, delay sensitive Internet of Things (IOT) applications may primarily use latency)

The purpose of the system described here is to diagnose and mitigate the most probable network causes (poor QoS) of unsatisfactory service performance (poor QoE). Three distinct time frames are employed in what follows. The following notational conventions will be used to describe these time frames: h will denote past (historical times), t will denote the current (most recent) time, and f will denote future times. The three time frames of interest are related to modes of operation of the system:

Historical: The period of interest is from $h_1$ to $h_2$ where $h_1 < h_2 < t$

Reactive: The period of interest is the current time t—this may require the analysis of data over an interval h<t (where h could be indefinite if data is discounted into the past as described later)

Proactive: The period of interest is from t to f where t<f

Forecast/Predicting QoS, QoE

Figure 6:
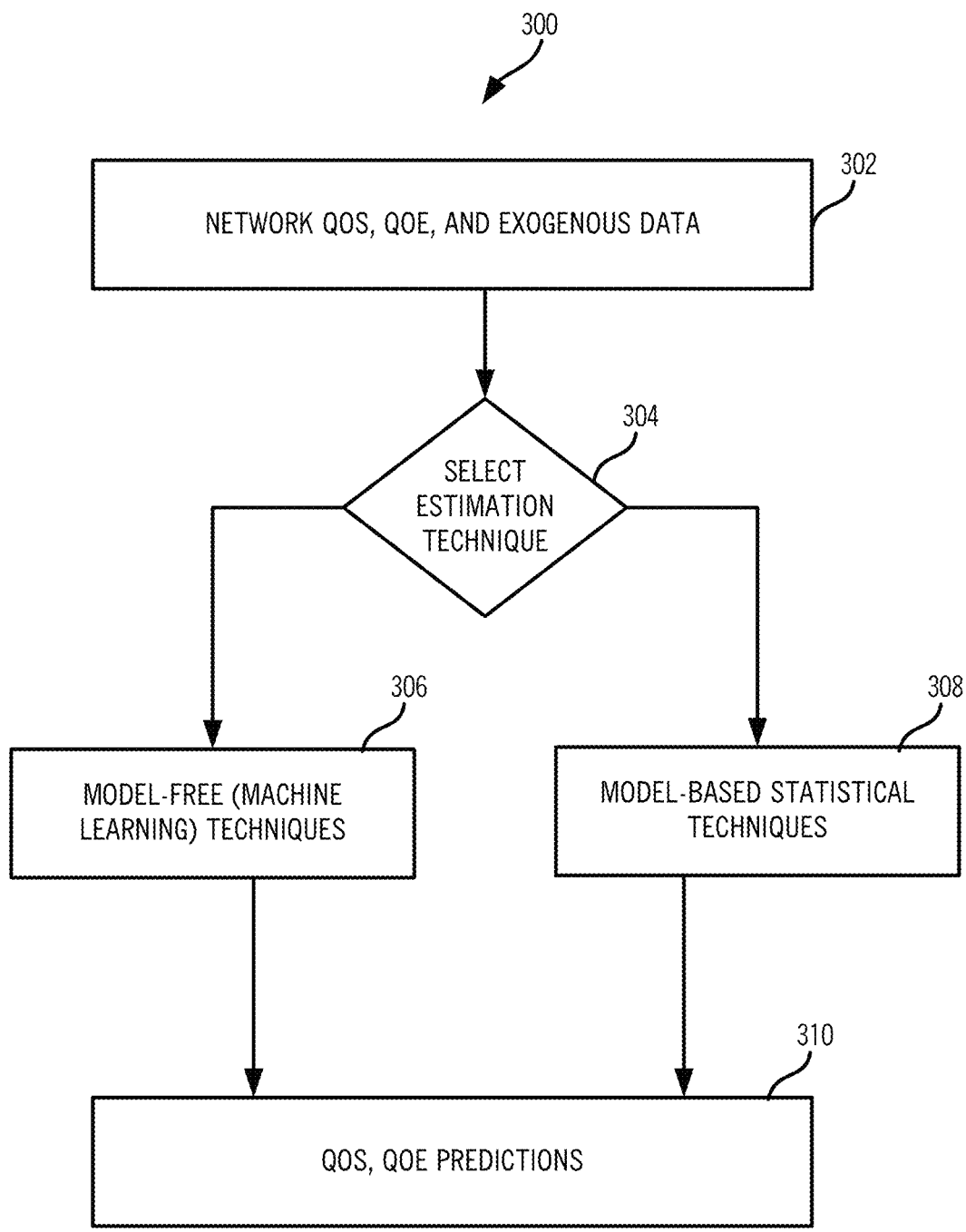
FIG. 6 is a flowchart of a process for forecasting/predicting QoS and/or QoE.

FIG. 6 is a flowchart of a process 300 for forecasting/predicting QoS and/or QoE. The process 300 includes obtaining network QoS data, QoE data, and exogenous (external from the network) data (step 302) and selecting an estimation technique (step 304). The estimation technique can include model-free (machine learning) techniques (step 306) and/or model-based statistical techniques (step 308). An output from the estimation techniques includes QoS and/or QoE predictions (step 310). The QoS and/or QoE predictions can be for a single service, a group of services, extrapolated for various services, etc.

Machine learning or statistical methods are used to incorporate predictable characteristics such as trends and seasonality into QoE and/or QoS forecasts. These forecasts are used to predict the times and locations of QoE and/or QoS violations (values outside engineered ranges) for which pro-active corrective action can be taken. QoS can be used as probable cause of poor QoE and candidates for pro-active corrective action. In an embodiment, joint forecasting of QoE and QoS can be via machine learning or statistical techniques to incorporate predictable characteristics and co-movements or correlations into joint QoS and QoE forecasts. The forecasting can include exogenous data: with machine learning or statistical techniques used to incorporate exogenous data such as announced schedules of sporting or entertainment events into joint QoS and QoE forecasts.

The relationship between QoS and QoE can be expressed in a model-free or a model-based manner. Both support the incorporation of exogenous data. In a model-free approach the relationship between QoS and QoE is captured directly. The simplest embodiment is as a set of vectors (QoS, QoE) of observations relating QoE to QoS that can be searched using a nearest-neighbor approach. To estimate the QoE' corresponding to an observation QoS' that does not explicitly appear in the table, the QoS values are searched to find the closest match or matches to QoS' (nearest-neighbors according to some suitable distance function). The corresponding QoE values can be used (for example, by averaging) to estimate QoE'. A more sophisticated example of creating such a direct relationship between QoS and QoE is to train a neural network. In either case, the training can be performed offline in a lab or using observations from a working network.

Alternatively, the relationship between QoS and QoE can be expressed in a model-based manner using statistical methods. For example, a linear model $QOE=\alpha+\Sigma_i\beta_i \cdot QOS_i$ expresses QoE as a random function of QoS: the model parameters a and can be estimated from measured means, variances, and correlations of QoS and QoE using a suitable statistical procedure (for example, least squares fitting or maximum likelihood). Once the model has been estimated, QoS inputs can be used to estimate QoE. In the linear example above, port k packet loss is "repaired" by setting $QOS_k=0$ yielding a QOE estimate $QOE'=\alpha+\Sigma_{i\neq k}\beta_i \cdot QOS_i$ following the repair.

A practical network implementation includes a large number of services. It is not efficient to measure QoS and/or QoE for every service. In an embodiment, the adaptive systems and methods utilize extrapolation of instrumented service diagnostics. For example, this can include a setting in a network which collects QoS measurements, a service A which collects QoE measurements, and a service B which does not collect QoE measurements. Using the diagnostic techniques, the identified probable causes of poor QoE for service A are used to make inferences about the probable causes of poor QoE for service B.

As a more specific example of extrapolation, consider a network supporting two services A and B where QoS measurements are available for network ports, where the two services A and B share some ports in the network, QoE measurements are collected by the service A edge devices, and QoE measurements are not collected by the service B edge devices. QoE improvements can be made to service B by inferring suitable corrective actions from the diagnostic techniques that relate QoS and QoE for service A.

In an embodiment, either model-free (machine learning) or model-based (statistical) techniques can "trained" to relate the network QoS state and content player QoE for service A. The diagnostic techniques of the trained system can be applied to network QoS to identify ports that are the likely root causes of poor QoE for service A: repairing these ports is expected to improve the performance of service B as well.

In another embodiment, a probe can be defined to be a QoE instrumented player whose measurements are available for analysis. To analyze the quality of a targeted unmeasured streaming service (service B), the following steps can be performed 1) identify the set S of service B content players whose QoE is to be estimated and potentially improved. 2) Associate each player s in S with an instrumented probe p (for example, from service A): the association should minimize the "distance" between the stream routes r(s) and r(p) of the matched players. The distance is designed to decrease with the number of shared links, for example $$Dist(r(s),r(p))=links(r(s))+links(r(p))-2 \cdot shared(r(s),r(p))$$

Let P denote the set of probes associated with S as described above. 3) Identify the (ordered) set C of most probable causes of poor QoE for the set P of instrumented probes by applying the diagnostics from service A. 4) Sequentially mitigate the causes of poor QoE performance in C until suitable stopping criteria are reached (for example, number of allowed repairs, total cost of repairs, etc.): this should induce an improvement in QoE for service B as well.

The adaptive systems and methods provide adaptive network control where QoS, QoE, and exogenous data is used to forecast QoE which is used to mitigate any problems. The mitigation plan can contain a schedule of corrective steps designed to maintain QoE within target levels. If the QoE forecasts predict violations of target QoE, a new mitigation plan is developed and scheduled for implementation.

Non-Video Environments

The adaptive systems and methods can be applied to environments beyond adaptive bitrate video streaming. This requires the use of a broader range of QoS and QoE metrics. Embodiments for three services are considered, e.g., gaming, Voice over IP (VoIP), and Augmented Reality/Virtual Reality (AR/VR). Networks where only some services or some edge devices have measured QoE can be accommodated. For example, model-free (machine learning) or model-based (statistical) techniques can be "trained" to relate the network (QoS) state and QoE measured by a set of instrumented edge devices. The trained system can be used to identify network QoS states that have a high likelihood of inducing QoE impairments.

Examples of candidate services and QoE metrics that are critical include (but are not limited to): VoIP (packet loss, latency), Internet of Things (IOT) (latency), gaming (packet loss, latency/jitter, frames per second), etc. Network QoS impairments can be generalized to include large components that are complete sub-networks. For example, QoS could be measured for a cloud-based data-center or transport network (in the latter case, a single QoS metric would be replaced by a matrix of inlet-outlet pairs).

Adaptive QoS, QoE Analytics

Figure 7:
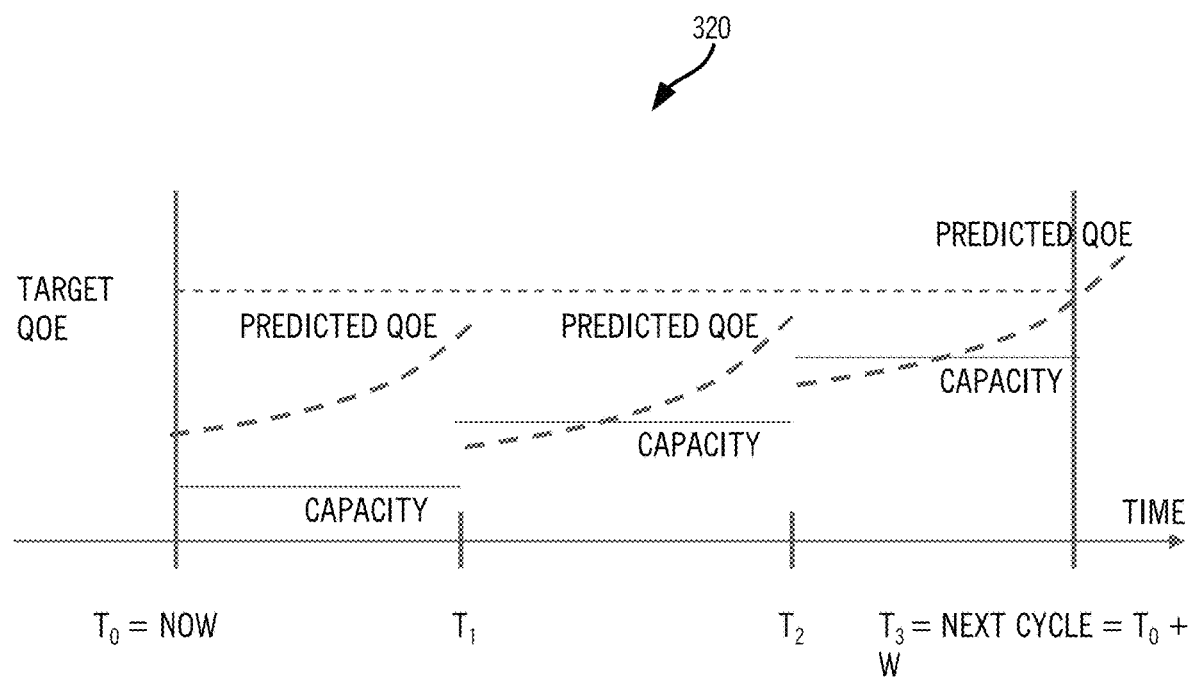
FIG. 7 is a graph of QoE versus time.
Figure 8:
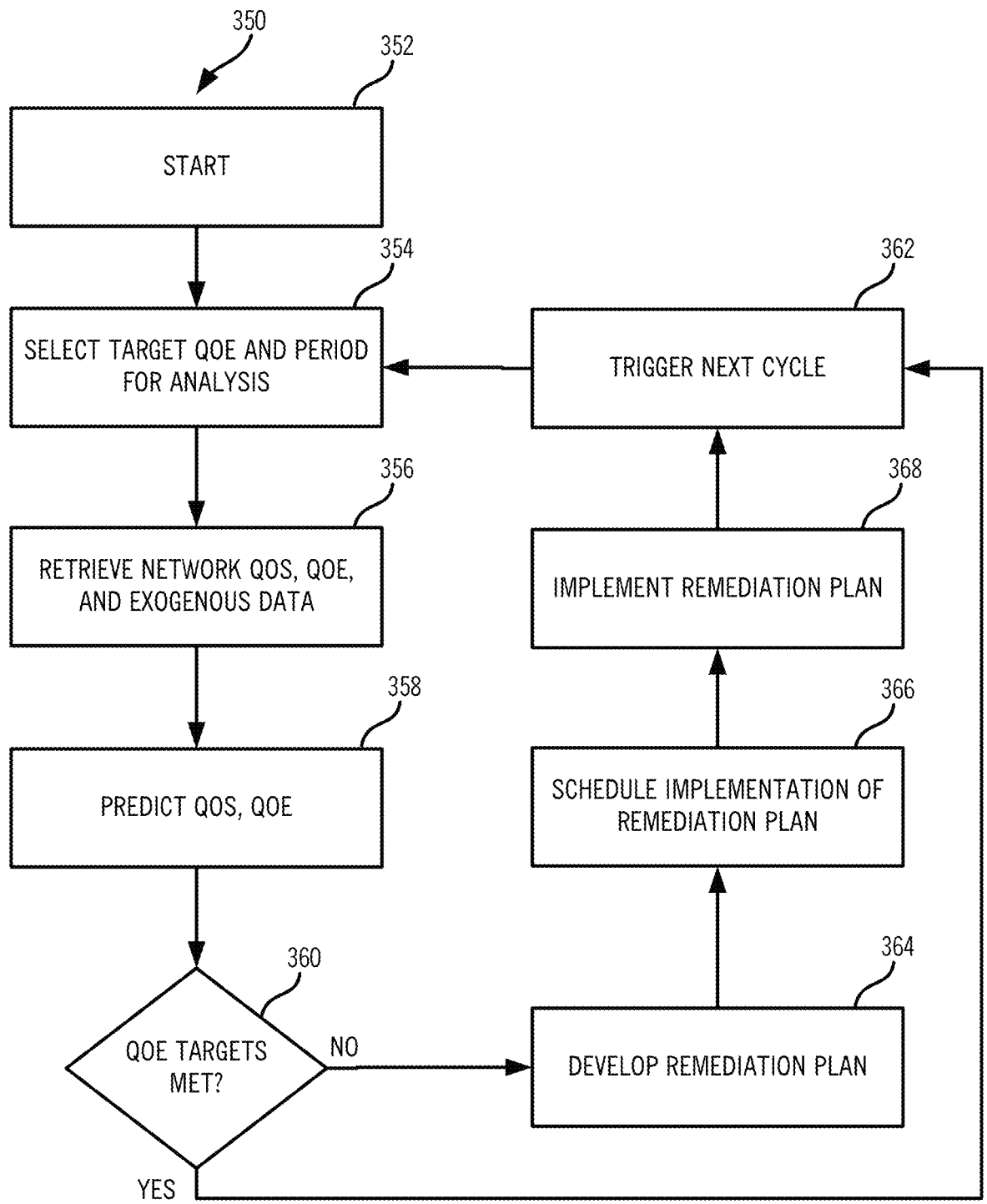
FIG. 8 is a flowchart of an adaptive QoE process.
Figure 9:
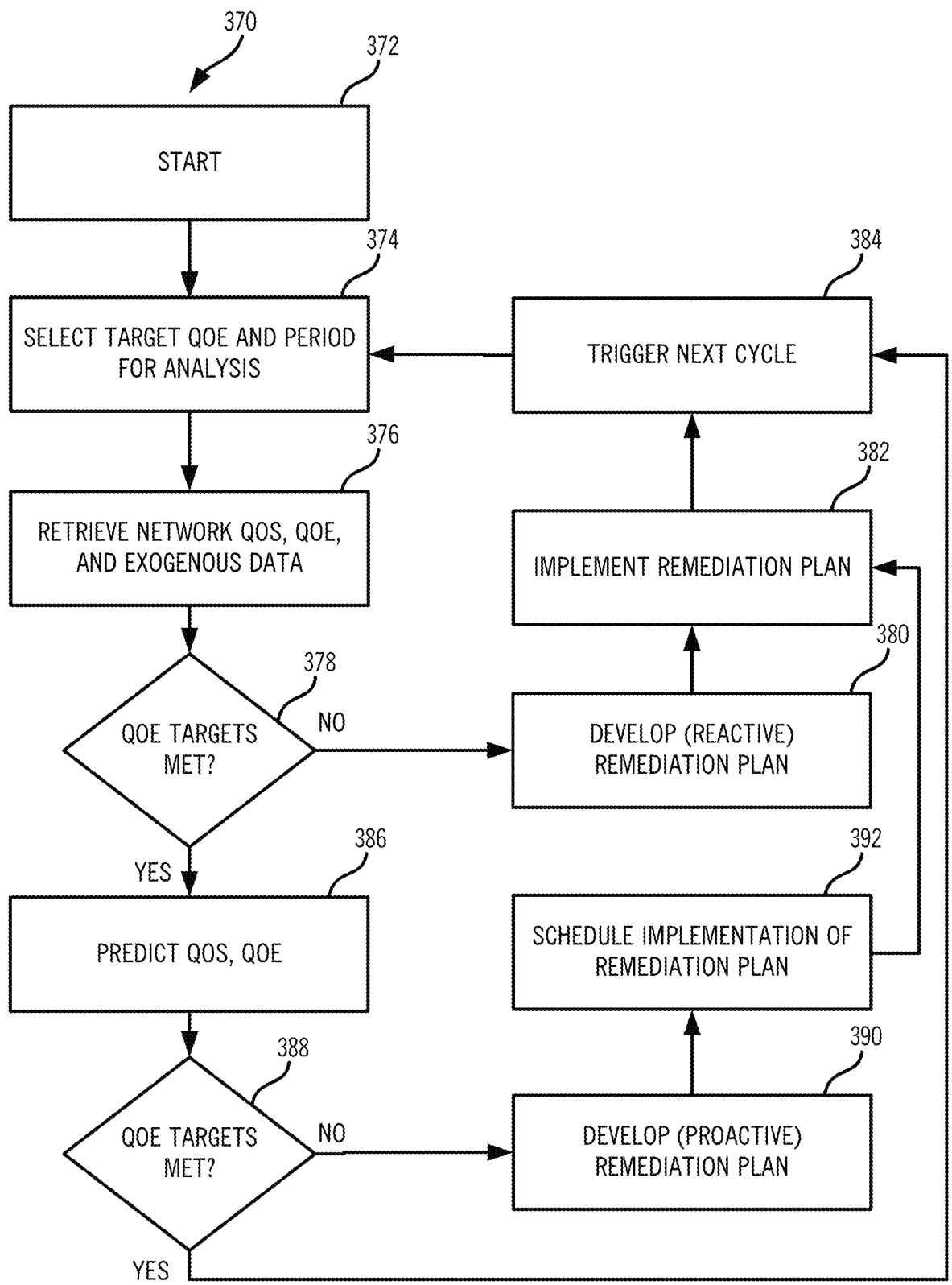
FIG. 9 is a flowchart of another adaptive QoE process with reactive and proactive remediation.

FIG. 7 is a graph of QoE (modeled as an impairment in this example) versus time as well as target QoE. It also shows the planned capacity increases selected to maintain QoE below target levels. FIG. 8 is a flowchart of an adaptive QoE process 350. FIG. 9 is a flowchart of another adaptive QoE process 370 with reactive and proactive remediation. For the adaptive systems and methods, the following assumptions are made. A) QoS and QoE are measured and a mechanism is available for predicting their future values either separately or jointly to a quantifiable level of confidence, or B) QoS is measured and mechanisms are available for predicting future QoS and for estimating the corresponding QoE, Options are available for improving QoS—these may be increases in link capacity, network routing or topology changes, changing content source caches, etc. A mechanism is available for estimating the resulting QoE' if the current QoS is changed to QoS'. A mechanism is available for estimating how anticipated/measured exogenous events are expected to affect QoS (for example, scheduled events such as sports events, hit television shows, etc.). QoE targets are available for a user defined window of duration W, that is, from current time $T_0$ to time $T_0+W$. A QoS mitigation plan is in place for the window W: this plan contains a schedule of QoS mitigation steps scheduled for implementation at $T_1, T_2, \ldots$ designed to ensure (to some user-defined confidence) that QoE targets will be met over the duration of the window.

In FIG. 7, at each time $T_0$, one of the following conditions will apply: 1) predicted QoE lies within target QoE over the window W with no further action required, 2) QoS impacting exogenous data are revealed (for example, the schedule for a blockbuster show is announced): QoE predictions including this data signal target QoE violations within the mitigation window ending at time $T_0+W$, 3) new QoE measurements signal that immediate target QoE violations have occurred, and 4) QoE predictions using the latest QoS/QoE measurements signal target QoE violations within the mitigation window ending at time $T_0+W$: this requires continuous QoE prediction and analysis as new measurements come in. An alternative is to set periodic checkpoints $T_c < T_0+W$: reaching a checkpoint triggers a re-evaluation and extension of the mitigation plan to cover up to time $T_c+W$. The expected QoE violations require a new mitigation plan In FIG. 8, the process 350 starts (step 352), a target QoE and time period is selected for analysis (step 354), and network QoS, QoE, and exogeneous data is retrieved (step 356). The process 350 includes predicting the QoS and QoE (step 358). The process 350 includes checking the predicted QoE versus a target value (step 360), and if the target is met, the process 350 triggers a next cycle (step 362) returning to step 354. If the QoE target is not met (step 360), a remediation plan is developed (step 364), the implementation of the remediation plan is scheduled (step 366), the remediation plan is implemented (step 368), and the next cycle is triggered (step 362).

In FIG. 9, the process 370 starts (step 372), a target QoE and time period is selected for analysis (step 374), and network QoS, QoE, and exogeneous data is retrieved (step 376). The process 370 includes checking if QoE targets are met based on measured data (step 378), and if not, the process 370 includes developing a reactive remediation plan (step 380), implementing the remediation plan (step 382), and triggering a next cycle (step 384) returning to step 374. Here, if the measured QoE is below the target, there is no need for estimating future QoE.

If the measured QoE meets the target (step 378), the process 370 includes predicting QoS and QoE (step 386). The process 370 includes checking the predicted QoE versus a target value (step 388), and if the target is met, the process 350 triggers a next cycle (step 384) returning to step 374. If the QoE target is not met (step 388), a proactive remediation plan is developed (step 390), the implementation of the remediation plan is scheduled (step 392), the remediation plan is implemented (step 382), and the next cycle is triggered (step 384).

The processes 350, 370 contain several loops: there is an explicit loop for the process 350 (or 2 loops for the process 370) that monitors QoE and QoE predictions and develops a remediation plan and implementation schedule to ensure that target QoE is met. There is an implicit loop within the process block for development of the remediation plan (described in detail in FIG. 10).

The process 370 is an embodiment that explicitly separates the reactive step and proactive steps that are combined in the process 350. A new cycle begins by setting/reviewing the target QoE and analysis window A as required. Network QoS, QoE, and exogenous data are retrieved for the analysis window A. A check is made to see if the QoE at time to violates target QoE. If such a violation occurs, the block Develop (reactive) remediation plan determines steps to mitigate immediate QoE violations which are enacted by Implement remediation plan. Trigger next cycle then updates the time for the next analysis cycle. If the QoE at time to does not violate target QoE a proactive analysis is performed for the window W. The block Predict QoS, QoE forecasts QoE over W (using exogenous data if this is available): if target QoE violations are predicted to occur over W, Develop remediation plan, Schedule implementation of remediation plan, and Implement remediation plan prepare and schedule mitigation actions. This logic also supports historical analysis except that the Predict QoS, QoE and Implement remediation plan blocks are vacuous.

Remediation Plan

Figure 10:
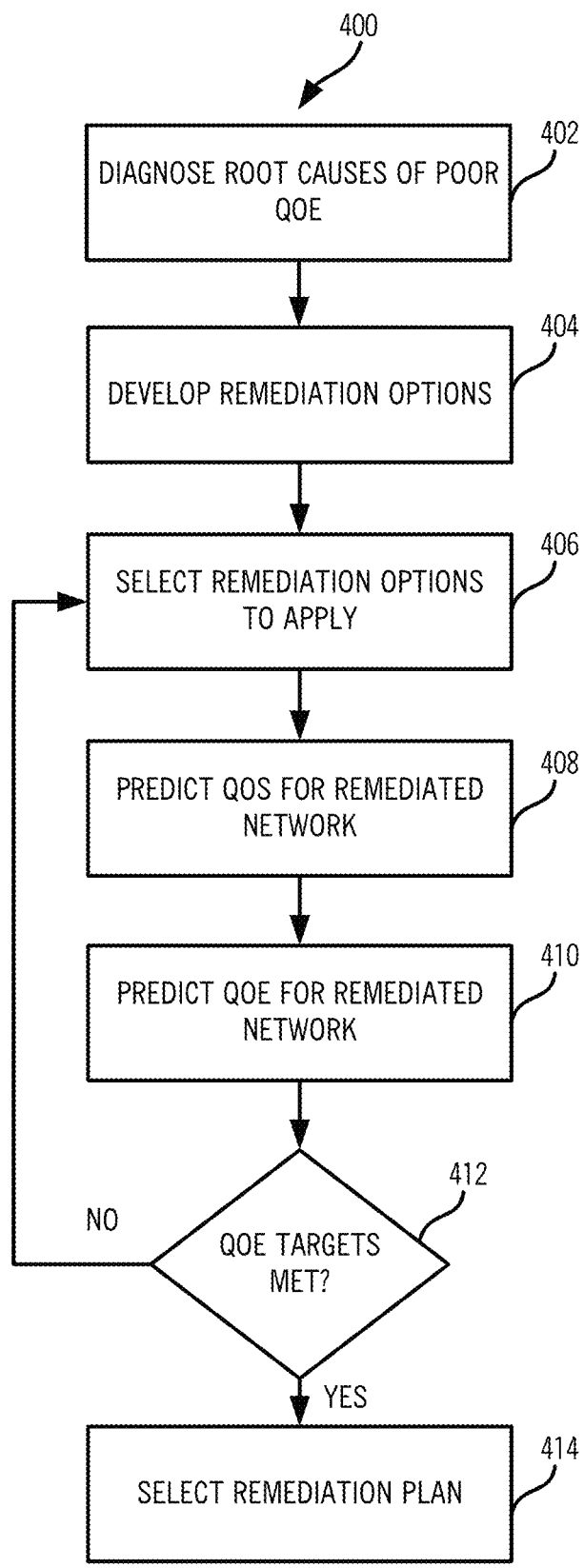
FIG. 10 is a flowchart of a remediation plan process.

FIG. 10 is a flowchart of a remediation plan process 400. The remediation plan process 400 includes diagnosing the network QoS induced causes of QoE violations over the mitigation window (step 402) to develop remediation options (step 404). The remediation plan process 400 selects remediation options to apply (step 406), i.e., candidate mediation options (including the time of application): these can be capacity changes, content cache changes, stream routing changes, etc. The selection can include selecting the candidate root causes that will be mitigated and through which options: typically, these are organized into the most desirable sequence of application (those predicted to have the most impact and can be repaired at least cost are preferred).

The remediation plan process 400 can predict QoS for the remediated network (step 408) and can predict QoE for the remediated network (step 410). These predictions estimate the network QoS resulting from application of the mitigations. The QoS estimates are used to predict the QoE that is produced. The process 400 can iterate through the mitigation options until the target QoE is met (step 412): the output is a plan that identifies the selected mitigation options as well as their time of application (step 414).

Root Cause Diagnosis

Figure 11:
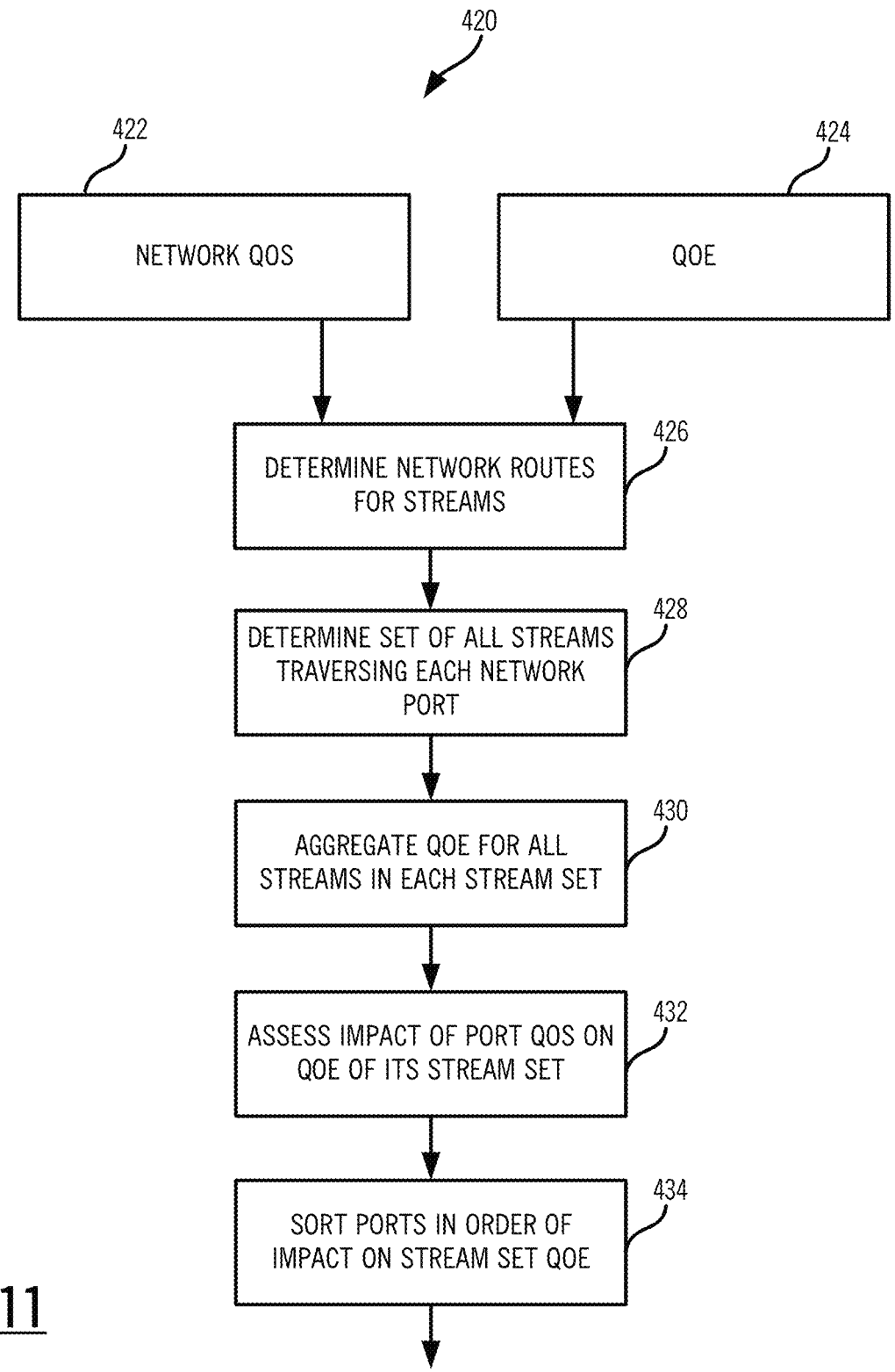
FIG. 11 is a flowchart of a root cause diagnosis process.

FIG. 11 is a flowchart of a root cause diagnosis process 420. The root cause diagnosis process 420 obtains network QoS data (step 422) and inferred or measured QoE data (step 424). The root cause diagnosis process 420 includes determining network routes for streams (step 426), determining a set of all streams traversing each network port (step 428), aggregating QoE for all streams in each stream set (step 430), assessing impact of port QoS on QoE of its stream set (step 432), and sorting ports in order of impact of stream set QoE (step 434).

The root cause diagnosis process 420 identifies the most likely network causes of poor QoE: an example model-based embodiment is described as follows. Determine the route (sequence of traversed ports) from source to destination for each stream. Use the stream routes to construct the set S(P) of all steams traversing each network port P. Aggregate the QoE for each steam set S(P): this will typically include aggregation over multiple observation times and may employ statistical model-based methods such as averaging, discounting, computing correlations, or some other method. Assess the impact I(P) of each port P's QoS upon the associated stream set S(P). For example, in a linear model-based approach where the network impairment is port packet loss, a port P can be "repaired" producing QoS' identical to QoS except that the P-th component has been replaced by 0. The impact is set equal to the value of improvement I(P) =QOE' by using the model to predict $QOE' = \alpha + \Sigma_{i \ne P} \beta_i \cdot QOS_i$. Sort the ports P by decreasing impact I(P): the ports with the highest impacts are the best candidates for taking remedial action. Alternatively, model-free machine learning methods may be used to construct a direct relationship[ between the available QoS and QoE data. For example, a neural network could be trained to predict I(P)=QOE' directly from an input of "repaired" QoS' within the framework above.

Gaming QoE Analytics

Figure 12:
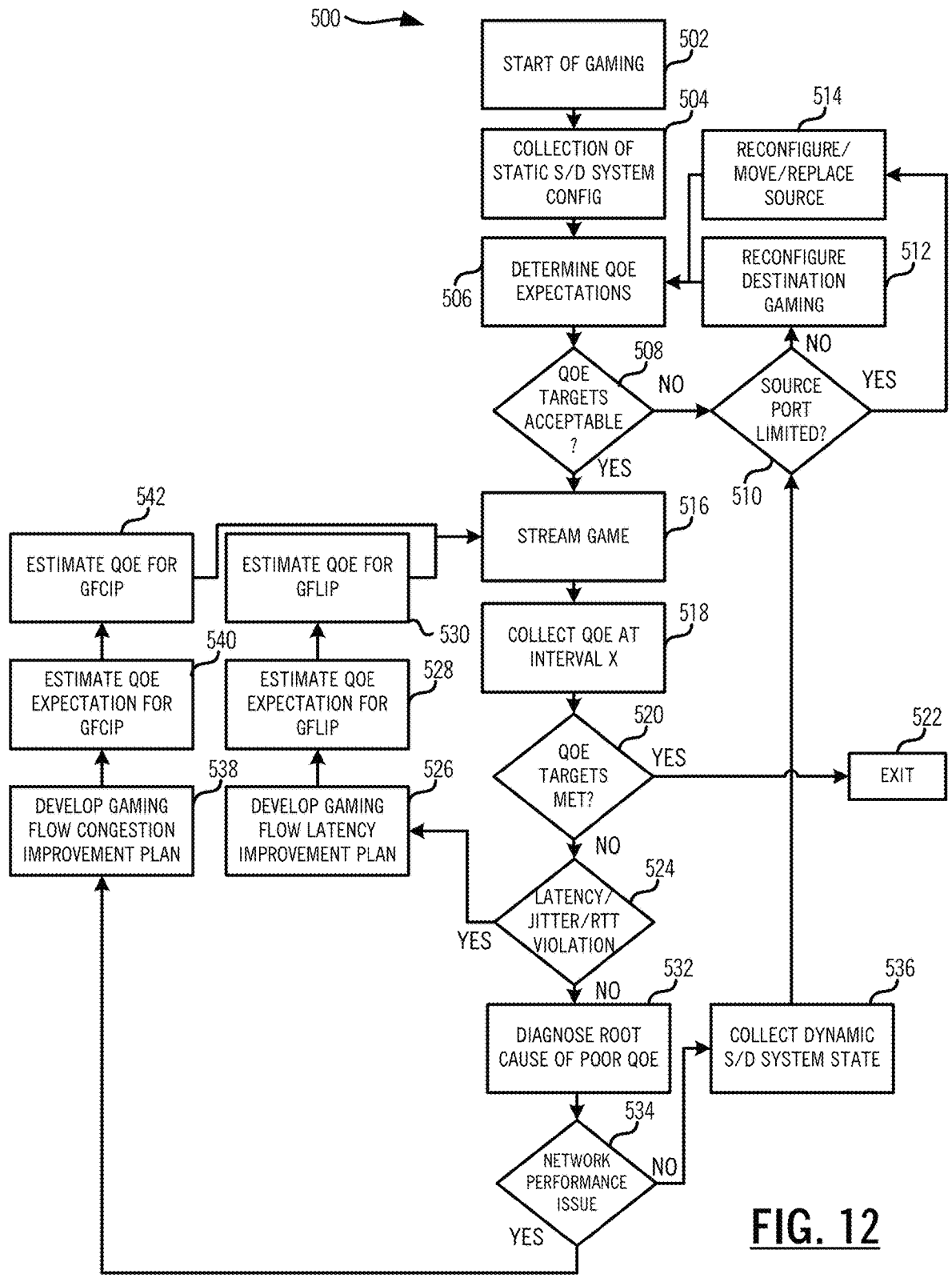
FIG. 12 is a flowchart of a gaming QoE analytics process.

FIG. 12 is a flowchart of a gaming QoE analytics process 500. In gaming, the key leading and lagging performance indicators are not items like buffering or resolution changes, instead they are based on responsiveness and rendering speed. Today, the most prevalent metrics are Frames Per Second (fps) and latency, which do not map to the same terms in networking. Instead fps is the number of frames rendered to the monitor per second and the latency/jitter focuses on time from client-side game request to client receiving a response from the server and its variations. In this instantiation, the gaming QoE analytics process 500 implements a dual (or more generally, multiple) metric approach that focuses on congestion and latency-based impairments. Such an approach could be executed for video as well, but with such an explicit focus on latency and fps, it makes more sense for gaming.

Breaking down the impairment causes for each allows the gaming QoE analytics process 500 to focus on source/cloud, network, and destination causes for each of the two key metrics independently. A second layer of dynamic metrics is collected including bit rate, Round Trip Time (RTT), packet retransmits/loss, system performance metrics (e.g., memory, CPU state, GPU state, storage), and may include active remediation like Internet Control Message Protocol (ICMP) echos to test network responsiveness. The key network flow static information collected described herein continue to apply for Gaming. Root Cause Analysis is applied similar to the video use case.

The gaming QoE analytics process 500 includes starting a gaming session (step 502), collection of static Source/Destination (S/D) system configuration (step 504), and determining QoE expectations (step 506). If the QoE targets are not acceptable (step 508), the gaming QoE analytics process 500 determines if the source port is limited (step 510), and if not, the gaming QoE analytics process 500 includes reconfiguring the gaming destination (step 512) and returning to step 506. If the source port is limited (step 510), the gaming QoE analytics process 500 can include reconfiguring, moving, or replacing the source (step 514) and returning to step 506.

If the QoE targets are acceptable (step 508), the game is streamed (step 516). While the game is streamed, QoE data can be collected such as on an interval X (step 518). If the QoE targets are met based on the collected QoE data (step 520), the gaming QoE analytics process 500 exits (step 522). If the QoE targets are not met (step 520), the gaming QoE analytics process 500 includes checking if there is a latency, jitter, or RTT violation (step 524), and if so, the gaming QoE analytics process 500 includes developing a Gaming Flow Latency Improvement Plan (GFLIP) (step 526), estimating the QoE expectation for the GFLIP (step 528), and estimating the QoE for the GFLIP (step 530) and returning to step 516.

If there is not a latency, jitter, or RTT violation (step 524), the gaming QoE analytics process 500 includes diagnosing the root cause of poor QoE (step 532) and checks if there is a network performance issue (step 534). If there is not a network performance issue (step 534), the gaming QoE analytics process 500 includes collecting dynamic S/D system state (step 536) and returning to step 510.

If there is a network performance issue (step 534), the gaming QoE analytics process 500 includes developing a Gaming Flow Congestion Improvement Plan (GFCIP) (step 538), estimating QoE expectation for the GFCIP (step 540), and estimating the QoE for the GFCIP (step 542) and returning to step 516.

VoIP QoE Analytics

Figure 13:
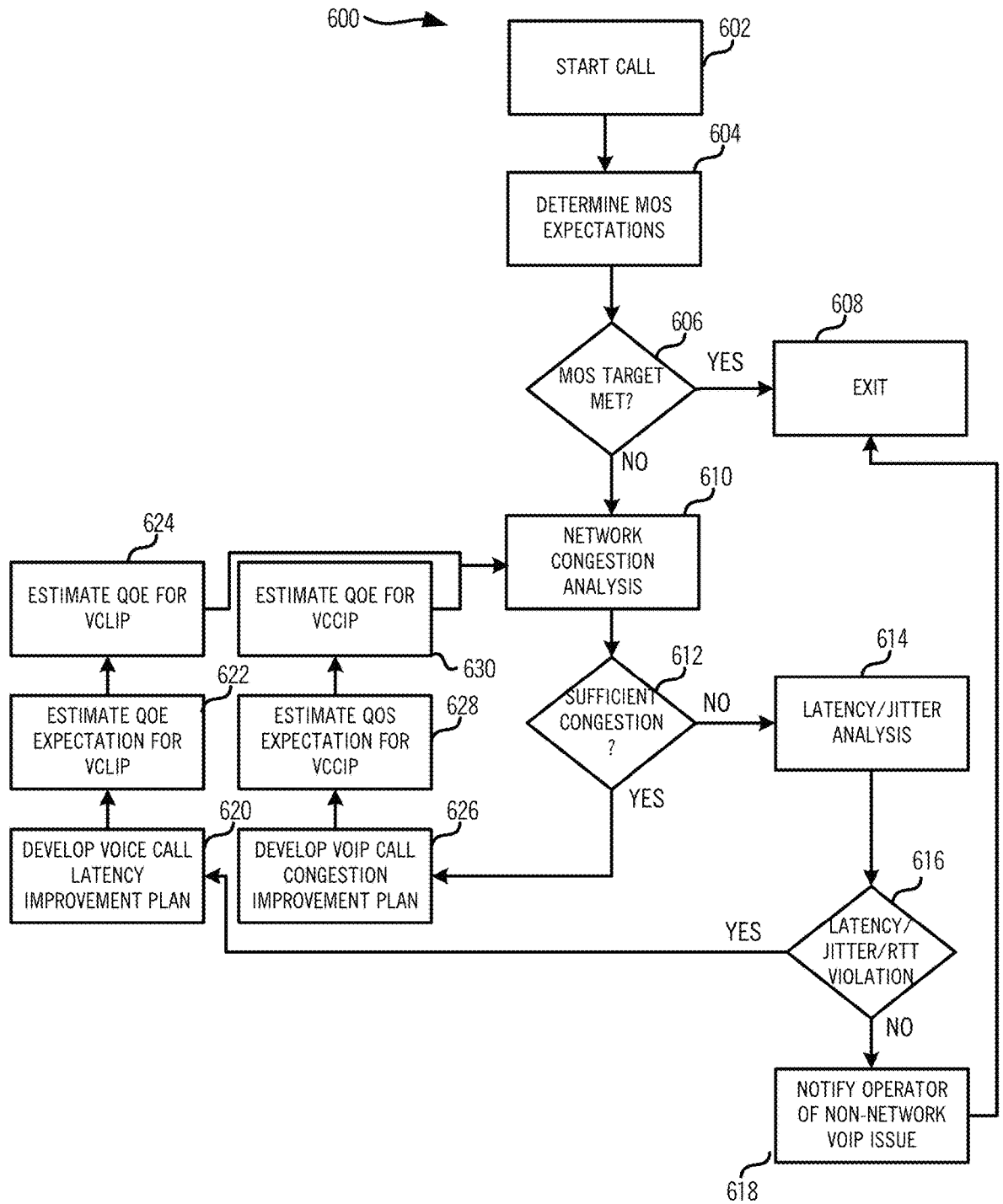
FIG. 13 is a flowchart of a Voice over Internet Protocol (VoIP) QoE analytics process.

FIG. 13 is a flowchart of a VoIP QoE analytics process 600. In VoIP, the key QoE performance indicator is the call Mean Opinion Score (MOS) rating through the Perceptual Evaluation of Speech Quality (PESQ) processes or the like. The MOS is derived from a wide variety for call quality measurements that are independent of the network. The network operator would generate a policy including a best quality level that it deems unacceptable, typically between 1-3 MOS points. There are many solutions to derive a historical or real time MOS score for a call.

The VoIP QoE analytics process 600 maps the IP flows for the unacceptable MOS qualified processes on to the network for visualization. Based on these flows, a similar analysis of the network as for video would be performed. However, the actual mathematics here would be much tighter as the impact of packet discard or delay is typically more significant impact than in a video.

In addition, the network would need to be able to estimate or test the end-to-end latency for the two calls. Measurements could be derived from Real Time Protocol (RTP)/Real Time Control Protocol (RTCP) XR, client-side RTT measurements, or by injecting ICMP echos or similar latency measurement techniques to measure the latency from a given point in the network where the VoIP call flows to each of the end device or as close as possible to get a response. Typically, greater than 150 ms one-way latency or a 250 ms RTT signals that the latency is unacceptable, and, in many cases, providers specify 50-75 ms as the highest latency acceptable with overall call jitter less than 50-75 ms as acceptable as well. Latency issues would generate a need to reroute or prioritize the flow. Note, an alternative to the MOS score is the ITU E-model which is functionally equivalent.

The VoIP QoE analytics process 600 includes a call starting (step 602), determining MOS expectations (or equivalent) (step 604), and determining if the MOS target is met (step 606). If the MOS target is met (step 606), the VoIP QoE analytics process 600 exits (step 608). If the MOS target is not met (step 606), the VoIP QoE analytics process 600 includes performing a network congestion analysis (step 610).

The VoIP QoE analytics process 600 includes determining if there is excessive congestion (step 612), and if not, the VoIP QoE analytics process 600 includes performing a latency/jitter analysis (step 614) to determine if there is a latency, jitter, or RTT violation (step 616). If there is not a latency, jitter, or RTT violation (step 616), the VoIP QoE analytics process 600 can include a notification to the operator of a non-network VoIP issue (step 618) and the VoIP QoE analytics process 600 exits (step 608).

If there is a latency, jitter, or RTT violation (step 616), the VoIP QoE analytics process 600 includes developing a Voice Call Latency Improvement Plan (VCLIP) (step 620), estimating QoE expectation for the VCLIP (step 622), and estimating QoE for the VCLP (step 624) and returning to step 610.

If there is sufficient congestion in the network (step 612), the VoIP QoE analytics process 600 includes developing a Voice Call Congestion Improvement Plan (VCCIP) (step 626), estimating QoE expectation for the VCCIP (step 628), and estimating QoE for the VCCIP (step 630) and returning to step 610.

AR/VR QoE Analytics

Figure 14:
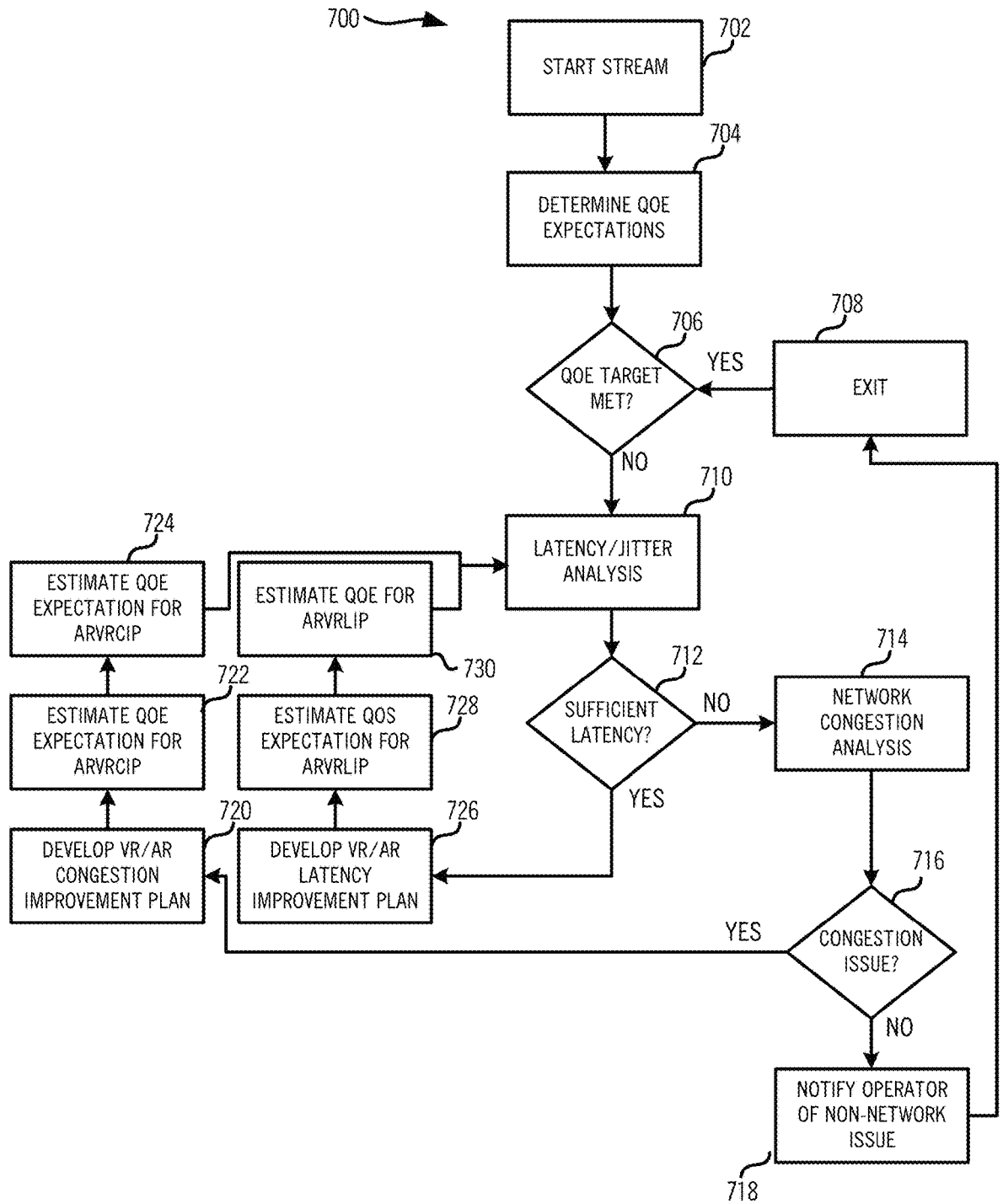
FIG. 14 is a flowchart of an Augmented Reality (AR)/Virtual Reality (VR) QoE analytics process.

FIG. 14 is a flowchart of an Augmented Reality (AR)/Virtual Reality (VR) QoE analytics process 700. AR/VR is a category of content that includes video, gaming, and image-based feedback depending on the use case. However, AR/VR almost certainly requires the real time telemetry feedback from the user to the application. In particular, the location of the user, the positioning of their body, and the inclination of their head is of interest but may include the positioning and motion vector of all components of the user body and any tools attached or nearby. The video and gaming components can be applied as described herein. However, AR/VR requires further measurement of the client sourced telemetry messaging. In particular, the latency may need to meet very tight constraints of less than 10 ms depending on the application. Measurement of the unidirectional or round-trip time, is likely to source from a client-side location. Latency issues would generate a need to reroute or prioritize the flow.

The AR/VR QoE analytics process 700 includes a stream starting (step 702), determining QoE expectations (step 704), and determining if the QoE target is met (step 706). If the QoE target is met (step 706), the AR/VR QoE analytics process 700 exits (step 708). If the QoE target is not met (step 708), the AR/VR QoE analytics process 700 includes performing a latency/jitter analysis (step 710).

The AR/VR QoE analytics process 700 includes determining if there is sufficient latency (step 712), and if not, the AR/VR QoE analytics process 700 includes performing a network congestion analysis (step 714) to determine if there is congestion issue in the network (step 716). If there is not a congestion issue (step 716), the AR/VR QoE analytics process 700 can include a notification to the operator of a non-network issue (step 718) and the AR/VR QoE analytics process 700 (step 708).

If there is a congestion issue (step 716), the AR/VR QoE analytics process 700 includes developing an AR/VR Congestion Improvement Plan (ARVRCIP) (step 720), estimating QoE expectation for the ARVRCIP (step 722), and estimating QoE for the ARVRCIP (step 724) and returning to step 710.

If there is sufficient latency in the network (step 712), the AR/VR QoE analytics process 700 includes developing an AR/VR Latency Improvement Plan (ARVRLIP) (step 726), estimating QoE expectation for the ARVRLIP (step 728), and estimating QoE for the ARVRLIP (step 730) and returning to step 710.

Optimization Process

Figure 15:
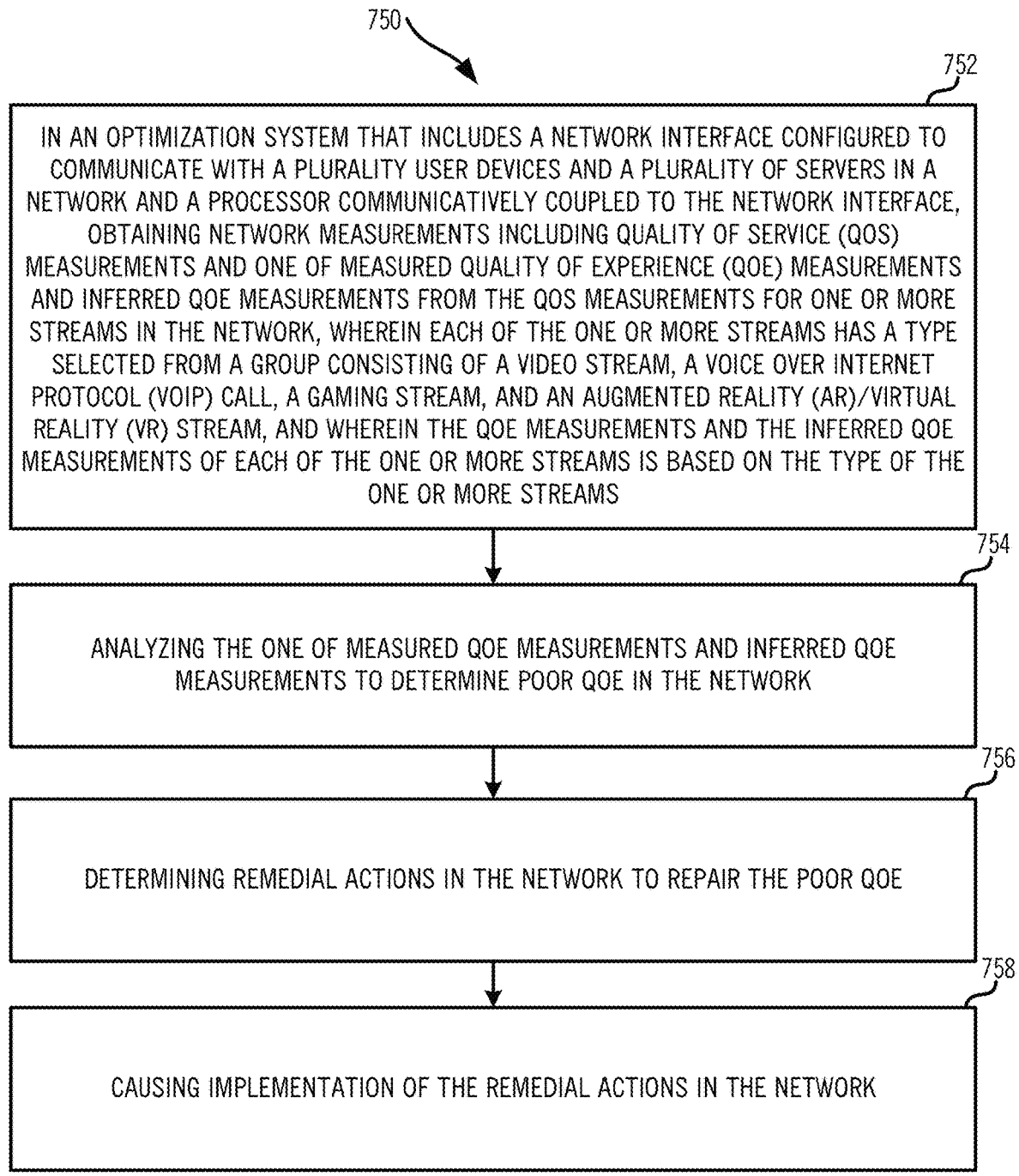
FIG. 15 is a flowchart of a process for optimization and enhancing QoS.

FIG. 15 is a flowchart of a process 750 for optimization and enhancing QoS. The process 750 includes, in an optimization system that includes a network interface configured to communicate with a plurality user devices and a plurality of servers in a network and a processor communicatively coupled to the network interface, obtaining network measurements including Quality of Service (QoS) measurements and one of measured Quality of Experience (QoE) measurements and inferred QoE measurements from the QoS measurements for one or more streams in the network, wherein each of the one or more streams has a type selected from a group consisting of a video stream, a Voice over Internet Protocol (VoIP) call, a gaming stream, and an Augmented Reality (AR)/Virtual Reality (VR) stream, and wherein the QoE measurements and the inferred QoE measurements of each of the one or more streams is based on the type of the respective stream (step 752); analyzing the one of measured QoE measurements and inferred QoE measurements to determine poor QoE in the network (step 754); determining remedial actions in the network to repair the poor QoE (step 756); and causing implementation of the remedial actions in the network (step 758).

The process 750 can include obtaining exogeneous data and incorporate the exogeneous data into future QoE predictions for the one or more streams, wherein the exogeneous data includes network failures, scheduled network outages, and traffic generating events. The process 750 can include extending the one of measured QoE measurements and inferred QoE measurements for the one or more services to additional services which do not have the network measurements. The additional services can share at least one link with the one or more services and the extended QoE is based on a number of shared links. The process 750 can include, subsequent to the implementation, continuing to monitor the one of measured QoE measurements and inferred QoE measurements relative to a target and continuing to determine and cause implementation of corresponding remedial actions in the network. The process 750 can include utilizing the obtained network measurements to estimate future QoS and/or QoE of the one or more services utilizing any of machine learning and statistical analysis, and utilizing the estimated future QoS and/or QoE to determine the remedial actions. The network measurements can include a plurality of latency, jitter, packet loss, Round Trip Time (RTT), frames per second, and congestion. The remedial actions can include any of capacity changes in the network, content cache changes in the network, routing changes for streams.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optimization platform system comprising:
a network interface configured to communicate with a plurality user devices and a plurality of servers in a network;
a processor communicatively coupled to the network interface; and
memory storing instructions that, when executed, cause the processor to
obtain network measurements including Quality of Service (QoS) measurements and one of: (1) measured Quality of Experience (QoE) measurements and (2) inferred QoE measurements from the QoS measurements for one or more streams in the network, wherein each of the one or more streams has a type selected from a group consisting of a video stream, a Voice over Internet Protocol (VoIP) call, a gaming stream, and an Augmented Reality (AR)/Virtual Reality (VR) stream, and wherein the one of: (1) the measured QoE measurements and (2) the inferred QoE measurements of each of the one or more streams is based on the type of the respective stream,
analyze the one of: (1) the measured QoE measurements and (2) the inferred QoE measurements to determine poor QoE in the network,
determine remedial actions in the network to repair the poor QoE,
cause implementation of the remedial actions in the network, and
extend the one of: (1) the measured QoE measurements and (2) the inferred QoE measurements for the one or more streams to additional streams that do not have the one of: (1) the measured QoE measurements and (2) the inferred QoE measurements for the one or more streams by making inferences about QoE and probable causes of poor QoE for the additional streams based on identified probable causes of the poor QoE of the one of: (1) the measured QoE measurements and (2) the inferred QoE measurements for the one or more streams,
wherein the additional streams share at least one link with the one or more streams and the extended QoE is based on a number of shared links.

2. The optimization platform system of claim 1, wherein the memory storing instructions that, when executed, further cause the processor to
obtain exogeneous data and incorporate the exogeneous data into future QoE predictions for the one or more streams, wherein the exogeneous data includes network failures, scheduled network outages, and traffic generating events.

3. The optimization platform system of claim 1, wherein the memory storing instructions that, when executed, further cause the processor to
subsequent to the implementation, continue to monitor the one of: (1) the measured QoE measurements and (2) the inferred QoE measurements relative to a target and continue to determine and cause implementation of corresponding remedial actions in the network.

4. The optimization platform system of claim 1, wherein the memory storing instructions that, when executed, further cause the processor to
utilize the obtained network measurements to estimate future QoS and/or QoE of the one or more streams utilizing any of machine learning and statistical analysis, and
utilize the estimated future QoS and/or QoE to determine the remedial actions.

5. The optimization platform system of claim 1, wherein the network measurements include a plurality of latency, jitter, packet loss, Round Trip Time (RTT), frames per second, and congestion.

6. The optimization platform system of claim 1, wherein the remedial actions include any of capacity changes in the network, content cache changes in the network, routing changes for streams.

7. A method comprising:
in an optimization system that includes a network interface configured to communicate with a plurality user devices and a plurality of servers in a network and a processor communicatively coupled to the network interface, obtaining network measurements including Quality of Service (QoS) measurements and one of: (1) measured Quality of Experience (QoE) measurements and (2) inferred QoE measurements from the QoS measurements for one or more streams in the network, wherein each of the one or more streams has a type selected from a group consisting of a video stream, a Voice over Internet Protocol (VoIP) call, a gaming stream, and an Augmented Reality (AR)/Virtual Reality (VR) stream, and wherein the one of: (1) the measured QoE measurements and (2) the inferred QoE measurements of each of the one or more streams is based on the type of the respective stream;
analyzing the one of: (1) the measured QoE measurements and (2) the inferred QoE measurements to determine poor QoE in the network;
determining remedial actions in the network to repair the poor QoE;
causing implementation of the remedial actions in the network; and
extending the one of: (1) the measured QoE measurements and (2) the inferred QoE measurements for the one or more streams to additional streams that do not have the one of: (1) the measured QoE measurements and (2) the inferred QoE measurements for the one or more streams by making inferences about the probable causes of poor QoE for the additional streams based on identified probable causes of the poor QoE of the one of: (1) the measured QoE measurements and (2) the inferred QoE measurements for the one or more streams,
wherein the additional streams share at least one link with the one or more streams and the extended QoE is based on a number of shared links.

8. The method of claim 7, further comprising
obtaining exogeneous data and incorporate the exogeneous data into future QoE predictions for the one or more streams, wherein the exogeneous data includes network failures, scheduled network outages, and traffic generating events.

9. The method of claim 7, further comprising
subsequent to the implementation, continuing to monitor the one of: (1) the measured QoE measurements and (2) the inferred QoE measurements relative to a target and continuing to determine and cause implementation of corresponding remedial actions in the network.

10. The method of claim 7, further comprising
utilizing the obtained network measurements to estimate future QoS and/or QoE of the one or more streams utilizing any of machine learning and statistical analysis, and
utilizing the estimated future QoS and/or QoE to determine the remedial actions.

11. The method of claim 7, wherein the network measurements include a plurality of latency, jitter, packet loss, Round Trip Time (RTT), frames per second, and congestion.

12. The method of claim 7, wherein the remedial actions include any of capacity changes in the network, content cache changes in the network, routing changes for streams.

13. A non-transitory computer-readable medium comprising instructions that, when executed, cause a processor, in an optimization system that includes a network interface configured to communicate with a plurality user devices and a plurality of servers in a network and the processor communicatively coupled to the network interface, to perform the steps of:
obtaining network measurements including Quality of Service (QoS) measurements and one of: (1) measured Quality of Experience (QoE) measurements and (2) inferred QoE measurements from the QoS measurements for one or more streams in the network, wherein each of the one or more streams has a type selected from a group consisting of a video stream, a Voice over Internet Protocol (VoIP) call, a gaming stream, and an Augmented Reality (AR)/Virtual Reality (VR) stream, and wherein the one of: (1) the measured QoE measurements and (2) the inferred QoE measurements of each of the one or more streams is based on the type of the respective stream;
analyzing the one of: (1) the measured QoE measurements and (2) the inferred QoE measurements to determine poor QoE in the network;
determining remedial actions in the network to repair the poor QoE;
causing implementation of the remedial actions in the network; and
extending the one of: (1) the measured QoE measurements and (2) the inferred QoE measurements for the one or more streams to additional streams that do not have the one of: (1) the measured QoE measurements and (2) the inferred QoE measurements for the one or more streams by making inferences about the probable causes of poor QoE for the additional streams based on identified probable causes of the poor QoE of the one of: (1) the measured QoE measurements and (2) the inferred QoE measurements for the one or more streams, wherein the additional streams share at least one link with the one or more streams and the extended QoE is based on a number of shared links.

14. The non-transitory computer-readable medium of claim 13, wherein the instructions that, when executed, further cause the processor to perform the steps of obtaining exogeneous data and incorporate the exogeneous data into future QoE predictions for the one or more streams, wherein the exogeneous data includes network failures, scheduled network outages, and traffic generating events.

\* \* \* \* \*